United States Patent
Alabbasi et al.

(10) Patent No.: US 12,022,483 B2
(45) Date of Patent: Jun. 25, 2024

(54) DYNAMIC AND FLEXIBLE CONFIGURATIONS FOR CONFIGURED GRANTS

(71) Applicant: Telefonaktiebolaget LM Ericsson (publ), Stockholm (SE)

(72) Inventors: Abdulrahman Alabbasi, Kista (SE); John Walter Diachina, Garner, NC (US); Jonas Fröberg Olsson, Ljungsbro (SE); Torsten Dudda, Wassenberg (DE); Yufei Blankenship, Kildeer, IL (US); Zhenhua Zou, Solna (SE); Majid Gerami, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 547 days.

(21) Appl. No.: 17/280,532

(22) PCT Filed: Sep. 25, 2019

(86) PCT No.: PCT/SE2019/050918
§ 371 (c)(1),
(2) Date: Mar. 26, 2021

(87) PCT Pub. No.: WO2020/067978
PCT Pub. Date: Apr. 2, 2020

(65) Prior Publication Data
US 2022/0039144 A1    Feb. 3, 2022

Related U.S. Application Data

(60) Provisional application No. 62/737,679, filed on Sep. 27, 2018.

(51) Int. Cl.
*H04W 72/23* (2023.01)

(52) U.S. Cl.
CPC .................... *H04W 72/23* (2023.01)

(58) Field of Classification Search
CPC ................ H04W 72/23; H04W 72/20
See application file for complete search history.

(56) References Cited

U.S. PATENT DOCUMENTS

2018/0006956 A1* 1/2018 Bush ................. H04Q 9/00
2018/0199359 A1  7/2018 Cao et al.
(Continued)

FOREIGN PATENT DOCUMENTS

CN    103370896 A    10/2013
WO    2017180179 A1  10/2017

OTHER PUBLICATIONS

Author Unknown, "Technical Specification Group Radio Access Network; NR; Physical channels and modulation (Release 15)," Technical Specification 38.211, Version 15.2.0, 3GPP Organizational Partners, Jun. 2018, 96 pages.
(Continued)

*Primary Examiner* — Jenee Holland
(74) *Attorney, Agent, or Firm* — Withrow & Terranova, PLLC

(57) ABSTRACT

Systems and methods for dynamic and flexible configurations for configured grants are provided. In some embodiments, a method performed by a wireless device for configuring uplink grants includes receiving, from a network node, one or more indications to enable one or more configured grant configurations per cell and/or per BWP where at least one configured grant configuration indicating a plurality of transmission occasions within a period. The method also includes transmitting at least one transmission based on the at least one configured grant configuration. This may enable the use of different periodicity of mixed Time Sensitive Network (TSN), random Ultra-Reliable Low-Latency Communication (URLLC), and enhanced Mobile (Continued)

Broadband (eMBB) traffics; reduce the misalignment delay of the arrived data; improve the spectral efficiency of the eMBB traffic while satisfying the URLLC requirement; and/or reduce the number of Hybrid Automatic Repeat Request processes needed to transmit a considerable number of Configured Grant configurations.

23 Claims, 14 Drawing Sheets

(56) References Cited

U.S. PATENT DOCUMENTS

| | | | |
|---|---|---|---|
| 2018/0279326 A1* | 9/2018 | Park | H04L 5/0096 |
| 2019/0239172 A1* | 8/2019 | Hampel | H04W 56/0065 |
| 2019/0254057 A1* | 8/2019 | Hampel | H04W 28/02 |
| 2019/0363843 A1* | 11/2019 | Gordaychik | H04L 1/08 |
| 2020/0314665 A1* | 10/2020 | Cheng | H04W 72/542 |
| 2021/0227452 A1* | 7/2021 | Munz | H04W 76/10 |
| 2021/0289473 A1* | 9/2021 | Chae | H04W 72/0446 |
| 2021/0314982 A1* | 10/2021 | Panteleev | H04L 5/0053 |
| 2021/0321292 A1* | 10/2021 | Dudda | H04L 69/04 |
| 2021/0345193 A1* | 11/2021 | Miklós | H04W 36/0069 |
| 2021/0392664 A1* | 12/2021 | Alabbasi | H04W 72/1268 |

OTHER PUBLICATIONS

Author Unknown, "Technical Specification Group Radio Access Network; NR; Physical layer procedures for control (Release 15)," Technical Specification 38.213, Version 15.2.0, 3GPP Organizational Partners, Jun. 2018, 99 pages.
Author Unkown, "Technical Specification Group Radio Access Network; NR; Physical layer procedures for data (Release 15)," Technical Specification 38.214, Version 15.2.0, 3GPP Organizational Partners, Jun. 2018, 94 pages.
Author Unknown, "Technical Specification Group Radio Access Network; NR; Medium Access Control (MAC) protocol specification (Release 15)," Technical Specification 38.321, Version 15.2.0, 3GPP Organizational Partners, Jun. 2018, 73 pages.
Ericsson, "R1-1908126: Enhancement of Configured Grant for NR URLLC," 3GPP TSG RAN WG1 Meeting #98, Aug. 26-30, 2019, Prague, Czech Republic, 8 pages.
Ericsson, "Tdoc R1-1906097: On-intra-UE prioritization enablers," 3GPP TSG RAN WG1 Meeting #97, May 13-17, 2019, Reno, Nevada, 11 pages.
Ericsson, "Tdoc R2-1906841: On support of non-integer multiple of CG/SPS periodicities," 3GPP TSG-RAN WG2 #106, May 13-17, 2019, Reno, Nevada, 3 pages.
Nokia, et al., "R2-1909488: Support for TSC message periodicities of non-integer multiple of NR CG/SPS periodicities," 3GPP TSG-RAN WG2 Meeting #107, Aug. 26-30, 2019, Prague, Czech Republic, 8 pages.
NTT DOCOMO, Inc., et al., "R1-1809979: Summary of 7.2.6.3 Enhanced UL grant-free transmissions," 3GPP TSG RAN WG1 Meeting #94, Aug. 20-24, 2018, Gothenburg, Sweden, 20 pages.
VIVO, "R1-1808240: Discussion on the enhancements to configured grants," 3GPP TSG RAN WG1 Meeting #94, Aug. 20-24, 2018, Gothenburg, Sweden, 4 pages.
International Search Report and Written Opinion for International Patent Application No. PCT/SE2019/050918, dated Dec. 20, 2019, 28 pages.
First Office Action for Chinese Patent Application No. 201980063283.5, dated Nov. 30, 2023, 17 pages.

* cited by examiner

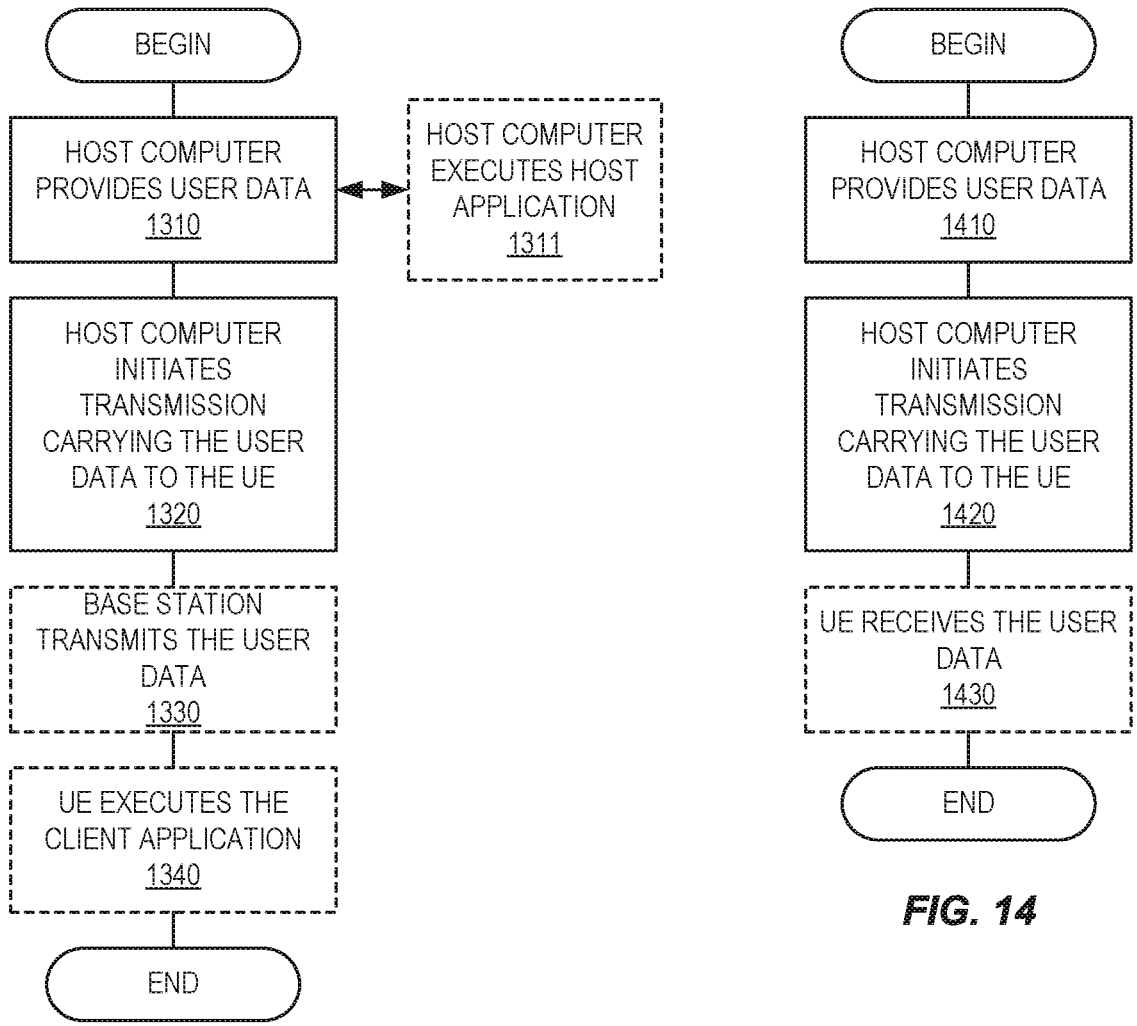

DYNAMIC AND FLEXIBLE CONFIGURATIONS FOR CONFIGURED GRANTS

RELATED APPLICATIONS

This application is a 35 U.S.C. § 371 national phase filing of International Application No. PCT/SE2019/050918, filed Sep. 25, 2019, which claims the benefit of provisional patent application Ser. No. 62/737,679, filed Sep. 27, 2018, the disclosures of which are hereby incorporated herein by reference in their entireties.

TECHNICAL FIELD

The present disclosure relates to uplink transmission configurations.

BACKGROUND

In New Radio (NR) a slot is defined to be 14 symbols and a subframe is 1 ms. The length of a subframe is hence as in Long Term Evolution (LTE) but depending of numerology the number of slots per subframe varies. On carrier frequencies below 6 GHz the numerologies 15 kHz and 30 kHz Sub-Carrier Spacing (SCS) are supported while 60 kHz SCS is optional for a User Equipment (UE). 15 kHz SCS equals the LTE numerology for normal cyclic prefix.

Downlink Control Information (DCI) is transmitted over a PDCCH (Physical Downlink Control Channel) and is blindly searched for by the UE. The search performed by the UE involves one or more decoding attempts that are performed based on a hypothetical PDCCH located in predefined time-frequency locations, called search space entry. The set of time-frequency locations where a PDCCH may be received is called a search space. In NR, the region of frequency resources within a slot wherein search space is defined is called CORESET (Control Region Set) and can be configured very flexibly. A UE can have several CORESETs configured. The search space for a CORESET may further consist of multiple time-locations where PDCCH is monitored.

NR further supports two types of transmissions, Type A and Type B. Type A transmissions are slot-based, where a slot is defined as 14 Orthogonal Frequency Division Multiplexing (OFDM) symbols, while Type B is non-slot-based. The purpose with Type B is to enable making short transmissions that can start and end more flexibly than Type A. Mini-slot transmissions can be dynamically scheduled and in rel-15:

(1) Can be of length 7, 4, or 2 symbols in Downlink (DL) and Uplink (UL)

(2) Can start and end within in any symbol within a slot.

Although NR supports flexible start and end of mini-slot transmissions, it may be convenient from a scheduling perspective to define Time Transmission Intervals (TTIs) and keep transmissions within a TTI. For DL, it may be convenient to define PDCCH monitoring occasions at regular time instances and keep DL transmissions between two consecutive monitoring occasions.

Type B transmissions are important for Ultra-Reliable Low-Latency Communication (URLLC) since they reduce latency; the transmissions can be scheduled and start sooner than for slot-based transmissions where scheduling and transmissions need to wait until the next slot.

NR supports two types of configured grants, Type 1 and Type 2. For Type 1, the UE is Radio Resource Control (RRC) configured with a grant that indicates all needed transmission parameters, while for Type 2 the configured grant is partly RRC configured and partly L1 signaled (Downlink Control Information (DCI) signaling). For Type 2 configured grants, the resource allocation follows a UL grant received on the DCI and the resource then recurs periodically. The period is configured by RRC. The UL grant has the time domain resource assignment field that provides a row index of a higher layer configured table Physical Uplink Control Channel (PUSCH)-symbolAllocation, where the indexed row defines the slot offset K2, the Start and Length Indicator (SLIV), and the PUSCH mapping type to be applied in the PUSCH transmission. The UE transmits a MAC-CE (Medium Access Control-Control Element) confirm message when the configured grant is activated or deactivated.

Configured grants can use one or more Hybrid Automatic Repeat Request (HARQ) processes. In the configuration of the configured grant, the number of HARQ processes is specified as well as a configuredGrantTimer which can take values of one or more periods P. The HARQ process ID is determined by (38.321, v15.2.0, Section 5.4.1):

For configured uplink grants, the HARQ Process ID associated with the first symbol of a UL transmission is derived from the following equation:

$$\text{HARQ Process ID} = [\text{floor}(\text{CURRENT\_symbol}/\text{periodicity})] \text{ modulo nrofHARQ-Processes}$$

where CURRENT_symbol=(System Frame Number (SFN)×numberOfSlotsPerFrame×numberOfSymbolsPerSlot+slot number in the frame×numberOfSymbolsPerSlot+symbol number in the slot), and numberOfSlotsPerFrame and numberOfSymbolsPerSlot refer to the number of consecutive slots per frame and the number of consecutive symbols per slot, respectively as specified in TS 38.211.

In NR, for Type 2 configuration grants, the activation/deactivation validation uses all of HARQ process ID bits. This is shown in Table 1, and Table 2.

NR Type 2 Configured Grant:

TABLE 1

Special fields for DL Semi-Persistent Scheduling (SPS) and UL grant Type 2 scheduling activation PDCCH validation (Table 10.2-1 in TS 38.213)

|  | DCI format 0_0/0_1 | DCI format 1_0 | DCI format 1_1 |
| --- | --- | --- | --- |
| HARQ process number | set to all '0's | set to all '0's | set to all '0's |
| Redundancy version | set to '00' | set to '00' | For the enabled transport block: set to '00' |

TABLE 2

Special fields for DL SPS and UL grant Type 2 scheduling release PDCCH validation (Table 10.2-2 in TS 38.213)

|  | DCI format 0_0 | DCI format 1_0 |
| --- | --- | --- |
| HARQ process number | set to all '0's | set to all '0's |
| Redundancy version | set to '00' | set to '00' |
| Modulation and coding scheme | set to all '1's | set to all '1's |
| Resource block assignment | set to all '1's | set to all '1's |

There currently exist certain challenges. Given that a UE has mix of services, URLLC and enhanced Mobile Broadband (eMBB) implement the current state of the art solutions for dynamic or configured grant might results in several problems. As such, systems and methods for dynamic and flexible configurations for configured grants are needed.

SUMMARY

Systems and methods for dynamic and flexible configurations for configured grants are provided. In some embodiments, a method performed by a wireless device for configuring uplink grants includes receiving, from a network node, one or more indications to enable one or more configured grant configurations per cell and/or per Bandwidth Part (BWP) where at least one configured grant configuration indicates a plurality of transmission occasions within a period. In some embodiments, the indication includes a single pattern for the multiple configurations. The method also includes transmitting, to the network node, at least one transmission based on the at least one configured grant configuration. This may enable the use of different periodicity of mixed Time Sensitive Network (TSN), random Ultra-Reliable Low-Latency Communication (URLLC), and enhanced Mobile Broadband (eMBB) traffics; reduce the misalignment delay of the arrived data; improve the spectral efficiency of the eMBB traffic while satisfying the URLLC requirement; and/or reduce the number of Hybrid Automatic Repeat Request (HARQ) processes needed to transmit considerable number of Configured Grant (CG) configurations.

In some embodiments, the single pattern for the multiple configurations is a packet generation pattern created using the respective packet generation patterns of the multiple configurations. In some embodiments, a periodicity of the single pattern is the greatest common factor of the periods of the multiple configurations. In some embodiments, the single pattern is a bitmap indicating the packet generation pattern within the period. In some embodiments, if the packet generation pattern includes multiple packets during the same transmission occasion, the bitmap includes that number of consecutive transmission occasions.

In some embodiments, the single pattern is a configuredGrantPattern. In some embodiments, the configuredGrantPattern is included in a ConfiguredGrantConfig. In some embodiments, the period of the single pattern is extended to a list of periods. In some embodiments, the indication further comprises a list of time offsets.

In some embodiments, the single pattern indicates multiple transmission occasions for at least one configured grant. In some embodiments, the period equals P and the pattern indicates that the transmission occasions start at time locations: N*P−2*t_offset, N*P−t_offset, N*P, N*P+t_offset, N*P+2*t_offset. In some embodiments, t_offset is the length of the transmission.

In some embodiments, receiving the indication comprises: receiving, by RRC, Type 1 and Type 2 configurations per Serving Cell and/or per BWP. In some embodiments, transmitting the at least one transmission based on the multiple configurations comprises transmitting the at least one transmission in order to reduce misalignment. In some embodiments, for Type 2, activation and deactivation are independent among the Serving Cells. In some embodiments, for the same Serving Cell, the MAC entity is configured with either Type 1 or Type 2.

In some embodiments, receiving the indication to enable multiple configurations allows having multiple periodical TSN traffic with different periodicities and/or starting times. In some embodiments, receiving the single pattern comprises a union of configurations to use different configurations that are repeated every new period.

In some embodiments, the method also includes determining that several configurations are all allowed for uplink, UL, transmission; and selecting one of the several configurations to use for a transmission. In some embodiments, all the ConfiguredGrantConfig can be used simultaneously, and the UL can transmit UL configured grant transmission in any of the occasion defined by any of the ConfiguredGrantConfig.

In some embodiments, it is possible to have several configurations (each can be Type 1 or Type 2), and each of the Type 2 configurations can be activated or deactivated separately. In some embodiments, this can be realized by associating the time and/or frequency resources with 'configurationID' (such as by Configured Scheduling-Radio Network Temporary Identifier (CS-RNTI)).

In some embodiments, the method also includes determining, when multiple UL configured grants are present, which Group Feature (GF) a retransmission is associated with, and which Hybrid Automatic Repeat Request HARQ process ID it should use. In some embodiments, the method also includes determining, to separately activate/deactivate each Type 2 configuration. In some embodiments, all active GFs (including Type 1 and Type 2) share the single CS-RNTI as in Rel-15; GF_process ID field is added in the DCI to indicate which GF process the DCI is associated with; and/or this is added in DCI formats for both the purposes of retransmission, as well as activation/de-activation.

In some embodiments, when multiple configurations are defined, more CS-RNTI may be introduced to differentiate them. In some embodiments, there are multiple configured grants Type 2 "processes" but a common CS-RNTI and/or the HARQ process number and/or redundancy version field in activation DCI may indicate the configured grant "process". In some embodiments, to activate the specific sequence of each configuration parameter, the DCI signal type is changed (possibly with the same number of bits) and/or the DCI signal will be used as index for the RRC (sequence) parameter.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 13 is a flowchart illustrating a method implemented in a communication system, according to some embodiments of the present disclosure;

FIG. 14 is a flowchart illustrating a method implemented in a communication system, according to some embodiments of the present disclosure;

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Figure 1:
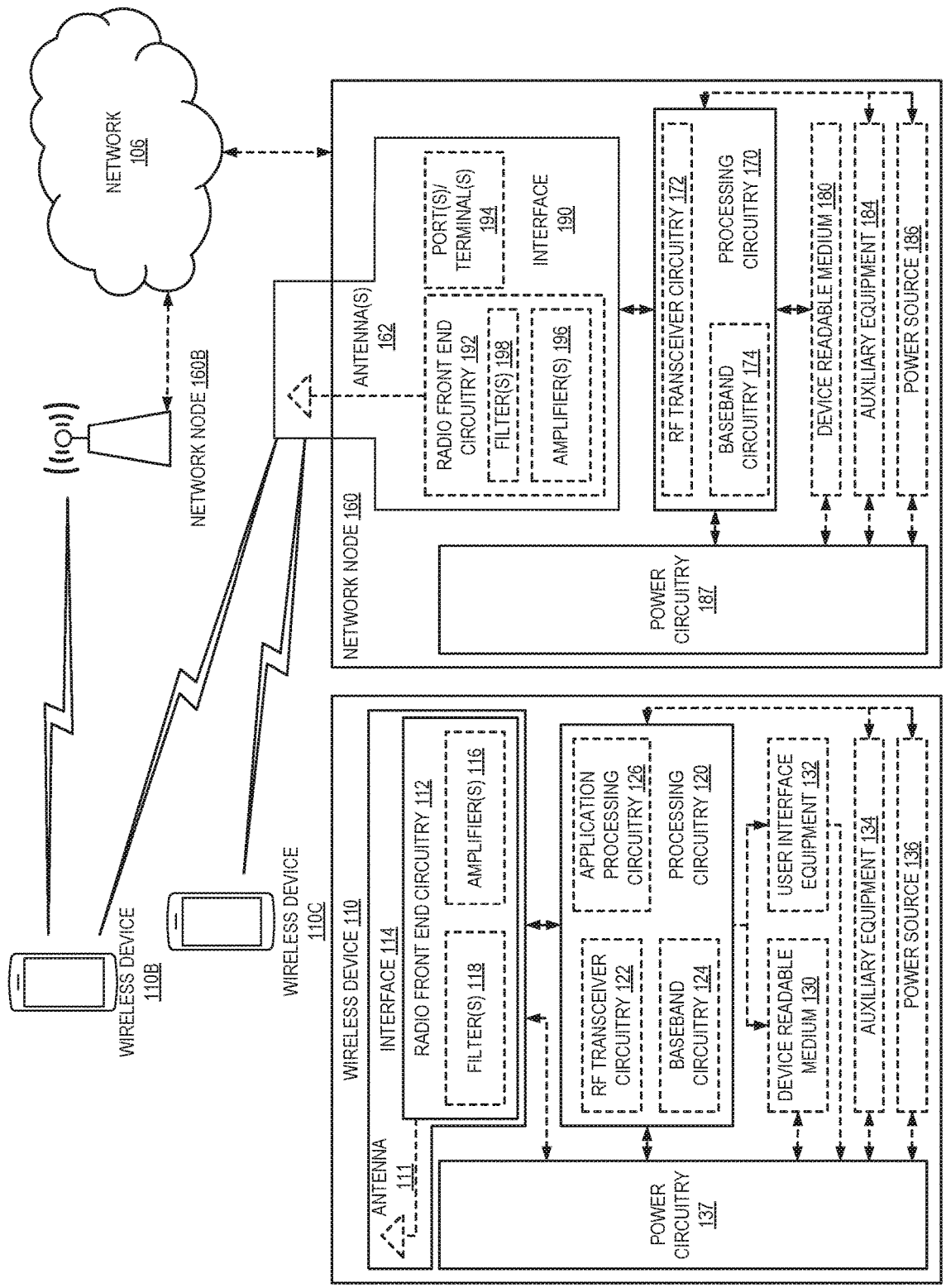
FIG. 1 shows an example architecture of a communications network, according to some embodiments of the present disclosure.

Although the subject matter described herein may be implemented in any appropriate type of system using any suitable components, the embodiments disclosed herein are described in relation to a wireless network, such as the example wireless network illustrated in FIG. 1. For simplicity, the wireless network of FIG. 1 only depicts a network 106, network nodes 160 and 160B, and Wireless Devices (WDs) 110, 110B, and 110C. In practice, a wireless network may further include any additional elements suitable to support communication between wireless devices or between a wireless device and another communication device, such as a landline telephone, a service provider, or any other network node or end device. Of the illustrated components, the network node 160 and the WD 110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable Second, Third, Fourth, or Fifth Generation (2G, 3G, 4G, or 5G) standards; Wireless Local Area Network (WLAN) standards, such as the IEEE 802.11 standards; and/or any other appropriate wireless communication standard, such as the Worldwide Interoperability for Microwave Access (WiMax), Bluetooth, Z-Wave, and/or ZigBee standards.

The network 106 may comprise one or more backhaul networks, core networks, Internet Protocol (IP) networks, Public Switched Telephone Networks (PSTNs), packet data networks, optical networks, Wide Area Networks (WANs), Local Area Networks (LANs), WLANs, wired networks, wireless networks, metropolitan area networks, and other networks to enable communication between devices.

The network node 160 and the WD 110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged, and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, Access Points (APs) (e.g., radio APs), Base Stations (BSs) (e.g., radio base stations, Node Bs, evolved Node Bs (eNBs), and New Radio (NR) Node Bs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or Remote Radio Units (RRUs), sometimes referred to as Remote Radio Heads (RRHs). Such RRUs may or may not be integrated with an antenna as an antenna integrated radio. Parts of a distributed radio base station may also be referred to as nodes in a Distributed Antenna System (DAS). Yet further examples of network nodes include Multi-Standard Radio (MSR) equipment such as MSR BSs, network controllers such as Radio Network Controllers (RNCs) or BS Controllers (BSCs), Base Transceiver Stations (BTSs), transmission points, transmission nodes, Multi-Cell/Multicast Coordination Entities (MCEs), core network nodes (e.g., Mobile Switching Centers (MSCs), Mobility Management Entities (MMEs)), Operation and Maintenance (O&M) nodes, Operations Support System (OSS) nodes, Self-Organizing Network (SON) nodes, positioning nodes (e.g., Evolved Serving Mobile Location Center (E-SMLCs)), and/or Minimization of Drive Tests (MDTs). As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 1, the network node 160 includes processing circuitry 170, a device readable medium 180, an interface 190, auxiliary equipment 184, a power source 186, power circuitry 187, and an antenna 162. Although the network node 160 illustrated in the example wireless network of FIG. 1 may represent a device that includes the illustrated combination of hardware components, other embodiments may comprise network nodes with different combinations of components. It is to be understood that a network node comprises any suitable combination of hardware and/or software needed to perform the tasks, features, functions, and methods disclosed herein. Moreover, while the components of the network node 160 are depicted as single boxes located within a larger box, or nested within multiple boxes, in practice, a network node may comprise multiple different physical components that make up a single illustrated component (e.g., the device readable medium 180 may comprise multiple separate hard drives as well as multiple Random Access Memory (RAM) modules).

Similarly, the network node 160 may be composed of multiple physically separate components (e.g., a Node B component and a RNC component, or a BTS component and a BSC component, etc.), which may each have their own respective components. In certain scenarios in which the network node 160 comprises multiple separate components (e.g., BTS and BSC components), one or more of the separate components may be shared among several network nodes. For example, a single RNC may control multiple Node Bs. In such a scenario, each unique Node B and RNC pair may in some instances be considered a single separate network node. In some embodiments, the network node 160 may be configured to support multiple Radio Access Technologies (RATs). In such embodiments, some components may be duplicated (e.g., a separate device readable medium 180 for the different RATs) and some components may be reused (e.g., the same antenna 162 may be shared by the RATs). The network node 160 may also include multiple sets of the various illustrated components for different wireless technologies integrated into the network node 160, such as, for example, GSM, Wideband Code Division Multiple Access (WCDMA), LTE, NR, WiFi, or Bluetooth wireless technologies. These wireless technologies may be integrated into the same or a different chip or set of chips and other components within the network node 160.

The processing circuitry 170 is configured to perform any determining, calculating, or similar operations (e.g., certain obtaining operations) described herein as being provided by a network node. These operations performed by the processing circuitry 170 may include processing information obtained by the processing circuitry 170 by, for example, converting the obtained information into other information, comparing the obtained information or converted information to information stored in the network node, and/or performing one or more operations based on the obtained information or converted information, and as a result of said processing making a determination.

The processing circuitry 170 may comprise a combination of one or more of a microprocessor, a controller, a microcontroller, a Central Processing Unit (CPU), a Digital Signal Processor (DSP), an Application Specific Integrated Circuit (ASIC), a Field Programmable Gate Array (FPGA), or any other suitable computing device, resource, or combination of hardware, software, and/or encoded logic operable to provide, either alone or in conjunction with other network node 160 components, such as the device readable medium 180, network node 160 functionality. For example, the processing circuitry 170 may execute instructions stored in the device readable medium 180 or in memory within the processing circuitry 170. Such functionality may include providing any of the various wireless features, functions, or benefits discussed herein. In some embodiments, the processing circuitry 170 may include a System on a Chip (SOC).

In some embodiments, the processing circuitry 170 may include one or more of Radio Frequency (RF) transceiver circuitry 172 and baseband processing circuitry 174. In some embodiments, the RF transceiver circuitry 172 and the baseband processing circuitry 174 may be on separate chips (or sets of chips), boards, or units, such as radio units and digital units. In alternative embodiments, part or all of the RF transceiver circuitry 172 and the baseband processing circuitry 174 may be on the same chip or set of chips, boards, or units.

In certain embodiments, some or all of the functionality described herein as being provided by a network node, base station, eNB, or other such network device may be performed by the processing circuitry 170 executing instructions stored on the device readable medium 180 or memory within the processing circuitry 170. In alternative embodiments, some or all of the functionality may be provided by the processing circuitry 170 without executing instructions stored on a separate or discrete device readable medium, such as in a hard-wired manner. In any of those embodiments, whether executing instructions stored on a device readable storage medium or not, the processing circuitry 170 can be configured to perform the described functionality. The benefits provided by such functionality are not limited to the processing circuitry 170 alone or to other components of the network node 160, but are enjoyed by the network node 160 as a whole, and/or by end users and the wireless network generally.

The device readable medium 180 may comprise any form of volatile or non-volatile computer readable memory including, without limitation, persistent storage, solid state memory, remotely mounted memory, magnetic media, optical media, RAM, Read Only Memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by the processing circuitry 170. The device readable medium 180 may store any suitable instructions; data or information, including a computer program; software; an application including one or more of logic, rules, code, tables, etc.; and/or other instructions capable of being executed by the processing circuitry 170 and utilized by the network node 160. The device readable medium 180 may be used to store any calculations made by the processing circuitry 170 and/or any data received via the interface 190. In some embodiments, the processing circuitry 170 and the device readable medium 180 may be considered to be integrated.

The interface 190 is used in the wired or wireless communication of signaling and/or data between the network node 160, a network 106, and/or WDs 110. As illustrated, the interface 190 comprises port(s)/terminal(s) 194 to send and receive data, for example to and from the network 106 over a wired connection. The interface 190 also includes radio front end circuitry 192 that may be coupled to, or in certain embodiments a part of, the antenna 162. The radio front end circuitry 192 comprises filters 198 and amplifiers 196. The radio front end circuitry 192 may be connected to the antenna 162 and the processing circuitry 170. The radio front end circuitry 192 may be configured to condition signals communicated between the antenna 162 and the processing circuitry 170. The radio front end circuitry 192 may receive digital data that is to be sent out to other network nodes or WDs via a wireless connection. The radio front end circuitry 192 may convert the digital data into a radio signal having the appropriate channel and bandwidth parameters using a combination of the filters 198 and/or the amplifiers 196. The radio signal may then be transmitted via the antenna 162. Similarly, when receiving data, the antenna 162 may collect radio signals which are then converted into digital data by the radio front end circuitry 192. The digital data may be passed to the processing circuitry 170. In other embodiments, the interface 190 may comprise different components and/or different combinations of components.

In certain alternative embodiments, the network node 160 may not include separate radio front end circuitry 192; instead, the processing circuitry 170 may comprise radio front end circuitry and may be connected to the antenna 162 without separate radio front end circuitry 192. Similarly, in some embodiments, all or some of the RF transceiver circuitry 172 may be considered a part of the interface 190. In still other embodiments, the interface 190 may include the one or more ports or terminals 194, the radio front end circuitry 192, and the RF transceiver circuitry 172 as part of a radio unit (not shown), and the interface 190 may communicate with the baseband processing circuitry 174, which is part of a digital unit (not shown).

The antenna 162 may include one or more antennas, or antenna arrays, configured to send and/or receive wireless signals. The antenna 162 may be coupled to the radio front end circuitry 192 and may be any type of antenna capable of transmitting and receiving data and/or signals wirelessly. In some embodiments, the antenna 162 may comprise one or more omni-directional, sector, or panel antennas operable to transmit/receive radio signals between, for example, 2 gigahertz (GHz) and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as Multiple Input Multiple Output (MIMO). In certain embodiments, the antenna 162 may be separate from the network node 160 and may be connectable to the network node 160 through an interface or port.

The antenna 162, the interface 190, and/or the processing circuitry 170 may be configured to perform any receiving operations and/or certain obtaining operations described herein as being performed by a network node. Any information, data, and/or signals may be received from a WD, another network node, and/or any other network equipment. Similarly, the antenna 162, the interface 190, and/or the processing circuitry 170 may be configured to perform any transmitting operations described herein as being performed by a network node. Any information, data, and/or signals may be transmitted to a WD, another network node, and/or any other network equipment.

The power circuitry 187 may comprise, or be coupled to, power management circuitry and is configured to supply the components of the network node 160 with power for performing the functionality described herein. The power circuitry 187 may receive power from the power source 186. The power source 186 and/or the power circuitry 187 may be configured to provide power to the various components of the network node 160 in a form suitable for the respective components (e.g., at a voltage and current level needed for each respective component). The power source 186 may either be included in, or be external to, the power circuitry 187 and/or the network node 160. For example, the network node 160 may be connectable to an external power source (e.g., an electricity outlet) via an input circuitry or interface such as an electrical cable, whereby the external power source supplies power to the power circuitry 187. As a further example, the power source 186 may comprise a source of power in the form of a battery or battery pack which is connected to, or integrated in, the power circuitry 187. The battery may provide backup power should the external power source fail. Other types of power sources, such as photovoltaic devices, may also be used.

Alternative embodiments of the network node 160 may include additional components beyond those shown in FIG. 1 that may be responsible for providing certain aspects of the network node's functionality, including any of the functionality described herein and/or any functionality necessary to support the subject matter described herein. For example, the network node 160 may include user interface equipment to allow input of information into the network node 160 and to allow output of information from the network node 160. This may allow a user to perform diagnostic, maintenance, repair, and other administrative functions for the network node 160.

As used herein, WD refers to a device capable, configured, arranged, and/or operable to communicate wirelessly with network nodes and/or other WDs. Unless otherwise noted, the term WD may be used interchangeably herein with User Equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a Voice over IP (VoIP) phone, a wireless local loop phone, a desktop computer, a Personal Digital Assistant (PDA), a wireless camera, a gaming console or device, a music storage device, a playback appliance, a wearable terminal device, a wireless endpoint, a mobile station, a tablet, a laptop, Laptop Embedded Equipment (LEE), Laptop Mounted Equipment (LME), a smart device, a wireless Customer Premise Equipment (CPE), a vehicle mounted wireless terminal device, a connected vehicle, etc. A WD may support Device-to-Device (D2D) communication, for example by implementing a 3G Partnership Project (3GPP) standard for sidelink communication, Vehicle-to-Vehicle (V2V), Vehicle-to-Infrastructure (V2I), Vehicle-to-Everything (V2X), and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a Machine-to-Machine (M2M) device, which may in a 3GPP context be referred to as a Machine-Type Communication (MTC) device. As one particular example, the WD may be a UE implementing the 3GPP Narrowband IoT (NB-IoT) standard. Particular examples of such machines or devices are sensors, metering devices such as power meters, industrial machinery, home or personal appliances (e.g., refrigerators, televisions, etc.), or personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated in FIG. 1, a WD 110 includes an antenna 111, an interface 114, processing circuitry 120, a device readable medium 130, user interface equipment 132, auxiliary equipment 134, a power source 136, and power circuitry 137. The WD 110 may include multiple sets of one or more of the illustrated components for different wireless technologies supported by the WD 110, such as, for example, GSM, WCDMA, LTE, NR, WiFi, WiMAX, or Bluetooth wireless technologies, just to mention a few. These wireless technologies may be integrated into the same or different chips or set of chips as other components within the WD 110.

The antenna 111 may include one or more antennas or antenna arrays configured to send and/or receive wireless signals and is connected to the interface 114. In certain alternative embodiments, the antenna 111 may be separate from the WD 110 and be connectable to the WD 110 through an interface or port. The antenna 111, the interface 114, and/or the processing circuitry 120 may be configured to perform any receiving or transmitting operations described herein as being performed by a WD. Any information, data, and/or signals may be received from a network node and/or another WD. In some embodiments, radio front end circuitry and/or the antenna 111 may be considered an interface.

As illustrated, the interface 114 comprises radio front end circuitry 112 and the antenna 111. The radio front end circuitry 112 comprises one or more filters 118 and amplifiers 116. The radio front end circuitry 112 is connected to the antenna 111 and the processing circuitry 120 and is configured to condition signals communicated between the antenna 111 and the processing circuitry 120. The radio front end circuitry 112 may be coupled to or be a part of the antenna 111. In some embodiments, the WD 110 may not include separate radio front end circuitry 112; rather, the processing circuitry 120 may comprise radio front end circuitry and may be connected to the antenna 111. Similarly, in some embodiments, some or all of RF transceiver circuitry 122 may be considered a part of the interface 114. The radio front end circuitry 112 may receive digital data that is to be sent out to other network nodes or WDs via a wireless connection. The radio front end circuitry 112 may convert the digital data into a radio signal having the appropriate channel and bandwidth parameters using a combination of the filters 118 and/or the amplifiers 116. The radio signal may then be transmitted via the antenna 111. Similarly, when receiving data, the antenna 111 may collect radio signals which are then converted into digital data by the radio front end circuitry 112. The digital data may be passed to the processing circuitry 120. In other embodiments, the interface 114 may comprise different components and/or different combinations of components.

The processing circuitry 120 may comprise a combination of one or more of a microprocessor, a controller, a microcontroller, a CPU, a DSP, an ASIC, a FPGA, or any other suitable computing device, resource, or combination of hardware, software, and/or encoded logic operable to provide, either alone or in conjunction with other WD 110 components, such as the device readable medium 130, WD 110 functionality. Such functionality may include providing any of the various wireless features or benefits discussed herein. For example, the processing circuitry 120 may execute instructions stored in the device readable medium 130 or in memory within the processing circuitry 120 to provide the functionality disclosed herein.

As illustrated, the processing circuitry 120 includes one or more of the RF transceiver circuitry 122, baseband processing circuitry 124, and application processing circuitry 126. In other embodiments, the processing circuitry 120 may comprise different components and/or different combinations of components. In certain embodiments, the processing circuitry 120 of the WD 110 may comprise a SOC. In some embodiments, the RF transceiver circuitry 122, the baseband processing circuitry 124, and the application processing circuitry 126 may be on separate chips or sets of chips. In alternative embodiments, part or all of the baseband processing circuitry 124 and the application processing circuitry 126 may be combined into one chip or set of chips, and the RF transceiver circuitry 122 may be on a separate chip or set of chips. In still alternative embodiments, part or all of the RF transceiver circuitry 122 and the baseband processing circuitry 124 may be on the same chip or set of chips, and the application processing circuitry 126 may be on a separate chip or set of chips. In yet other alternative embodiments, part or all of the RF transceiver circuitry 122, the baseband processing circuitry 124, and the application processing circuitry 126 may be combined in the same chip or set of chips. In some embodiments, the RF transceiver circuitry 122 may be a part of the interface 114. The RF transceiver circuitry 122 may condition RF signals for the processing circuitry 120.

In certain embodiments, some or all of the functionality described herein as being performed by a WD may be provided by the processing circuitry 120 executing instructions stored on the device readable medium 130, which in certain embodiments may be a computer-readable storage medium. In alternative embodiments, some or all of the functionality may be provided by the processing circuitry 120 without executing instructions stored on a separate or discrete device readable storage medium, such as in a hard-wired manner. In any of those particular embodiments, whether executing instructions stored on a device readable storage medium or not, the processing circuitry 120 can be configured to perform the described functionality. The benefits provided by such functionality are not limited to the processing circuitry 120 alone or to other components of the WD 110, but are enjoyed by the WD 110 as a whole, and/or by end users and the wireless network generally.

The processing circuitry 120 may be configured to perform any determining, calculating, or similar operations (e.g., certain obtaining operations) described herein as being performed by a WD. These operations, as performed by the processing circuitry 120, may include processing information obtained by the processing circuitry 120 by, for example, converting the obtained information into other information, comparing the obtained information or converted information to information stored by the WD 110, and/or performing one or more operations based on the obtained information or converted information, and as a result of said processing making a determination.

The device readable medium 130 may be operable to store a computer program; software; an application including one or more of logic, rules, code, tables, etc.; and/or other instructions capable of being executed by the processing circuitry 120. The device readable medium 130 may include computer memory (e.g., RAM or ROM), mass storage media (e.g., a hard disk), removable storage media (e.g., a CD or a DVD), and/or any other volatile or non-volatile, non-transitory device readable and/or computer executable memory devices that store information, data, and/or instructions that may be used by the processing circuitry 120. In some embodiments, the processing circuitry 120 and the device readable medium 130 may be considered to be integrated.

The user interface equipment 132 may provide components that allow for a human user to interact with the WD 110. Such interaction may be of many forms, such as visual, audial, tactile, etc. The user interface equipment 132 may be operable to produce output to the user and to allow the user to provide input to the WD 110. The type of interaction may vary depending on the type of user interface equipment 132 installed in the WD 110. For example, if the WD 110 is a smart phone, the interaction may be via a touch screen; if the WD 110 is a smart meter, the interaction may be through a screen that provides usage (e.g., the number of gallons used) or a speaker that provides an audible alert (e.g., if smoke is detected). The user interface equipment 132 may include input interfaces, devices and circuits, and output interfaces, devices and circuits. The user interface equipment 132 is configured to allow input of information into the WD 110, and is connected to the processing circuitry 120 to allow the processing circuitry 120 to process the input information. The user interface equipment 132 may include, for example, a microphone, a proximity or other sensor, keys/buttons, a touch display, one or more cameras, a Universal Serial Bus (USB) port, or other input circuitry. The user interface equipment 132 is also configured to allow output of information from the WD 110 and to allow the processing circuitry 120 to output information from the WD 110. The user interface equipment 132 may include, for example, a speaker, a display, vibrating circuitry, a USB port, a headphone interface, or other output circuitry. Using one or more input and output interfaces, devices, and circuits of the user interface equipment 132, the WD 110 may communicate with end users and/or the wireless network, and allow them to benefit from the functionality described herein.

The auxiliary equipment 134 is operable to provide more specific functionality which may not be generally performed by WDs. This may comprise specialized sensors for doing measurements for various purposes, interfaces for additional types of communication such as wired communications, etc. The inclusion and type of components of the auxiliary equipment 134 may vary depending on the embodiment and/or scenario.

The power source 136 may, in some embodiments, be in the form of a battery or battery pack. Other types of power sources, such as an external power source (e.g., an electricity outlet), photovoltaic devices, or power cells may also be used. The WD 110 may further comprise the power circuitry 137 for delivering power from the power source 136 to the various parts of the WD 110 which need power from the power source 136 to carry out any functionality described or indicated herein. The power circuitry 137 may in certain embodiments comprise power management circuitry. The power circuitry 137 may additionally or alternatively be operable to receive power from an external power source, in which case the WD 110 may be connectable to the external power source (such as an electricity outlet) via input circuitry or an interface such as an electrical power cable. The power circuitry 137 may also in certain embodiments be operable to deliver power from an external power source to the power source 136. This may be, for example, for the charging of the power source 136. The power circuitry 137 may perform any formatting, converting, or other modification to the power from the power source 136 to make the power suitable for the respective components of the WD 110 to which power is supplied.

There currently exist certain challenges. Given that a UE (e.g., a wireless device 110) has mix of services, URLLC and enhanced Mobile Broadband (eMBB) implement the current state of the art solutions for dynamic or configured grant might results in several problems:

1. Allocation of configured grant with only mini-slot (2 os) size, with 1, 2, 4, 8 (K) repetition, for both traffics results in meeting URLLC requirements (strict latency) but very weak spectral efficiency, e.g., because of a Demodulated Reference Signal (DMRS), etc.

This is good if URLLC traffic has to be accommodated with mini-slot and it arrived at mid of the slot. However, if URLLC can be on a transmission interval of 4 os or 7 os or 14 os (e.g., because of early data arrival), then sending URLLC traffic on 2 os will meet URLLC requirements. This will improve spectral efficiency of MAC header.

2. Even if URLLC can be accommodated with larger transmission interval (e.g., 14 or 7 os), allocating Configured Grants (CGs) with large slots might have the following disadvantage:
   Missing the slot border (if the data arrived with a bit of misalignment/jitter)
   Increased latency of URLLC.

3. If data arrives early or is delayed (in compared to original schedule) OFDM symbols, with fixed configured grant some embodiments cannot mitigate such jitter/misalignment.

4. Current specification requires at least one HARQ process per CG process, which increases the number of HARQ processes.

Certain aspects of the present disclosure and their embodiments may provide solutions to these or other challenges.

Some embodiments enable efficient support for a mix of Time Sensitive Network (TSN) deterministic traffics via one or more of the following:
  1. Enabling the activation of multiple configurations per single Cell.
  2. Illustrating different possible solutions to such multiple configurations per CG.
  3. Addressing scenarios where the proposed solution mitigates misalignment/jitter.
  4. Proposing an alternative solution that uses sequences (patterns) of parameters within a single configuration of configured grant. Hence reducing the needed number of HARQ processes.
     a. Proposing some example of combination rules for the union of multiple configurations.
  5. Handling retransmission, activation/de-activation associated with multiple UL configured grants.

There are, proposed herein, various embodiments which address one or more of the issues disclosed herein.

Certain embodiments may provide one or more of the following technical advantages. According to some embodiments, the network would be able to,
1. Accommodate different periodicity of mixed TSN, random URLLC, and eMBB traffics.
2. Reduce the misalignment delay of the arrived data (TSN).
3. Improve the spectral efficiency of the eMBB traffic while satisfying the URLLC requirement.
4. Reduce the number of HARQ process needed to transmit considerable number of CG configurations.

Figure 2:
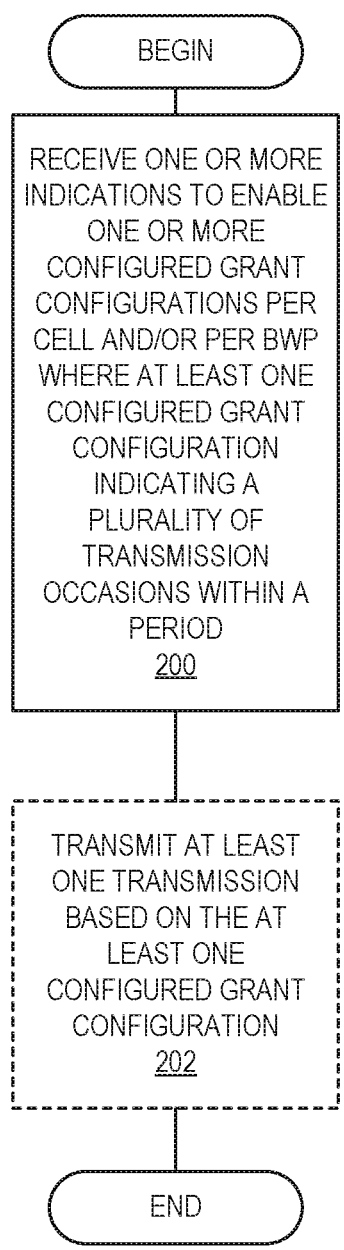
FIG. 2 is a flowchart illustrating a method implemented in a communication system, according to some embodiments of the present disclosure.

Systems and methods for dynamic and flexible configurations for configured grants are provided. FIG. 2 illustrates an exemplary embodiment for configuring uplink grants. In some embodiments, a method performed by a wireless device 110 for configuring uplink grants includes receiving, from a network node 160, one or more indications to enable one or more configured grant configurations per cell and/or per Bandwidth Part (BWP) where at least one configured grant configuration indicates a plurality of transmission occasions within a period (step 200). In some embodiments, the indication includes a single pattern for the multiple configurations. The method also includes transmitting, to the network node 160, at least one transmission based on the at least one configured grant configuration (step 202). This may enable the use of different periodicity of mixed TSN, random URLLC, and eMBB traffics; reduce the misalignment delay of the arrived data; improve the spectral efficiency of the eMBB traffic while satisfying the URLLC requirement; and/or reduce the number of HARQ processes needed to transmit considerable number of CG configurations.

In order to solve the above problem, some embodiments first propose a change to the current specification. The current specification (e.g., 3GPP TS 28.321) clearly mentioned that only one active configured grant is possible per cell per BWP. However, to solve the problems, some embodiments need to enable multiple active configurations per cell per BWP, as some embodiments proposed in the following text.

Type 1 and Type 2 are configured by RRC per Serving Cell and per BWP. Multiple configurations can be active simultaneously on one or multiple Serving Cells. For Type 2, activation and deactivation are independent among the Serving Cells. For the same Serving Cell, the MAC entity is configured with either Type 1 or Type 2.

Figure 3:
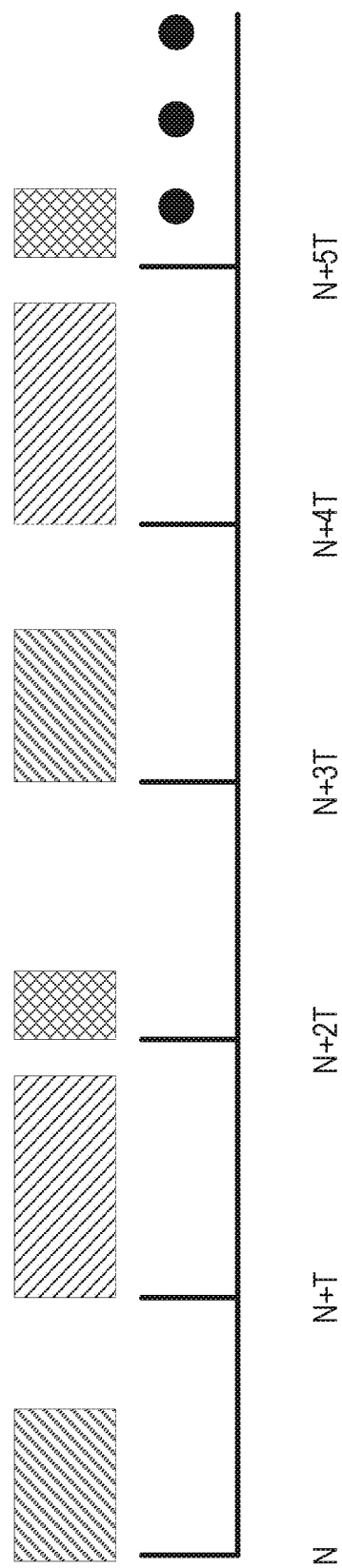
FIG. 3 illustrates example traffic with different periodicities and different arrival times, according to some embodiments of the present disclosure.

The above proposal solves the problem of having multiple periodical TSN (Time Sensitive Network) traffic with different periodicity and starting time, as shown in FIG. 3.

The blue packet is formed from two packets a+b or a long one, whereas the yellow packet is formed from three small ones, a+b+c, or a longer one. Packet 'a' arrive at n with T periodicity, Packet 'b' arrive at n with 3T periodicity. Packet 'c' arrives at n+T with 3T periodicity. Note that packets 'a,' 'b,' and 'c' might be generated from the same industrial node.

Some embodiments propose that the gNB sends a pattern or a union of configurations to the UE to use different configurations that are repeated every new period, e.g., 'CGConfigPatternList.' This which describes the set of configurations every slot. One example of the proposed addition is as follows:

```
    CGConfigPatternList            SEQUENCE{{2,3,1},....}
ConfiguredGrantConfig ::= SEQUENCE {
    configurationID    INTEGER (1..8) OPTIONAL -- Need OR
    frequencyHopping            ENUMERATED {mode1, mode2} OPTIONAL, -- Need S,
    cg-DMRS-Configuration   DMRS-UplinkConfig,
    mcs-Table          ENUMERATED {qam256, spare1} OPTIONAL, -- Need S
    mcs-TableTransformPrecoder ENUMERATED {qam256, spare1} OPTIONAL, -- Need S
    uci-OnPUSCH            SetupRelease { CG-UCI-OnPUSCH },
    resourceAllocation ENUMERATED { resourceAllocationType0, resourceAllocationType1, dynamicSwitch },
    rbg-Size           ENUMERATED {config2} OPTIONAL, -- Need S
    powerControlLoopToUse      ENUMERATED {n0, n1},
    p0-PUSCH-Alpha             P0-PUSCH-AlphaSetId,
    transformPrecoder          ENUMERATED {enabled} OPTIONAL, -- Need S
    nrofHARQ-Processes         INTEGER(1..16),
    repK           ENUMERATED {n1, n2, n4, n8},
    repK-RV            ENUMERATED {s1-0231, s2-0303, s3-0000} OPTIONAL, -- Cond RepK
    periodicity            ENUMERATED { sym2, sym7, sym1x14, sym2x14, sym4x14, sym5x14, sym8x14, sym10x14,
sym16x14, sym20x14, sym32x14, sym40x14, sym64x14, sym80x14, sym128x14, sym160x14, sym256x14, sym320x14, sym512x14,
sym640x14, sym1024x14, sym1280x14, sym2560x14, sym5120x14, sym6, sym1x12, sym2x12, sym4x12, sym5x12, sym8x12,
sym10x12, sym16x12, sym20x12, sym32x12, sym40x12, sym64x12, sym80x12, sym128x12, sym160x12, sym256x12, sym320x12,
sym512x12, sym640x12, sym1280x12, sym2560x12
                        },
    configuredGrantTimer       INTEGER (1..64) OPTIONAL, -- Need R
    rrc-ConfiguredUplinkGrant          SEQUENCE {
        timeDomainOffset           INTEGER (0..5119),
        timeDomainAllocation       INTEGER (0..15),
        frequencyDomainAllocation      BIT STRING (SIZE(18)),
        antennaPort                INTEGER (0..31),
        dmrs-SeqInitialization         INTEGER (0..1) OPTIONAL, -- Cond NoTransformPrecoder
        precodingAndNumberOfLayers         INTEGER (0..63),
        srs-ResourceIndicator          INTEGER (0..15),
    mcsAndTBS      INTEGER (0..31),
        frequencyHoppingOffset         INTEGER (1..maxNrofPhysicalResourceBlocks-1) OPTIONAL, -- Need M
        pathlossReferenceIndex         INTEGER (0..maxNrofPUSCH-PathlossReferenceRSs-1),
    ...
    }
        OPTIONAL -- Need R
}
```

Hence, UE will use Config-2, Config-3, Config-1, as the first member in the 'CGConfigPatternList. Then repeat the cycle from the beginning. On an alternative solution, UE can be given the choice to decide on the pattern based on the data arrival.

When several ConfiguredGrantConfigs are defined, each of them can have different value for each the parameters contained within. For example, Each ConfiguredGrantConfig can be Type 1 or Type 2 (and does not need to be the same type), as indicated by whether RRC-ConfiguredUplinkGrant is present; and/or Each ConfiguredGrantConfig has different frequency domain resource allocation; and/or Each ConfiguredGrantConfig has different time domain resource allocation; and/or Each ConfiguredGrantConfig Modulation and Coding Scheme (MCS)-Table; and/or Each ConfiguredGrantConfig has different repK; and/or Each ConfiguredGrantConfig has different periodicity.

Alternatively, for a given UE, several configurations are all allowed for UL transmission, as illustrated in the RRC parameter below. In other words, all the ConfiguredGrantConfig can be used simultaneously, and the UL can transmit UL configured grant transmission in any of the occasion defined by any of the ConfiguredGrantConfig. For a given instance, the UE chooses one GF configuration from the list of allowed configurations and use it for UL transmission. This is useful if the combined UL traffic pattern as illustrated in FIG. 3 is needed.

ConfiguredGrantConfigList ::= SEQUENCE {
SIZE(1..maxNrofConfigureGrant) OF ConfiguredGrantConfig}

The parameter maxNrofConfigureGrant can be defined as follows, for example.

maxNrofConfigureGrant INTEGER::=4—Maximum number of Configured Grant Configurations Alternatively, some embodiments propose to add the possibility of having several configurations (each can be Type 1 or Type 2), and each of the Type 2 configurations can be activated or deactivated separately. This can be realized by associating the time and/or frequency resources with 'configurationID'. One example of doing such association is through the Cell Specific Radio Network Temporary Identifier (CS-RNTI). Some embodiments assume having a list of CS-RNTI (with multiple entries), to scramble the DCI activation/de-activation commands. Each of the list member point out to specific 'configurationID'.

Some embodiments make a fixed mapping between the CS-RNTI list and the 'CGConfigPatternList', e.g., the first entry of CS-RNTI points to the first row in the 'CGConfigPatternList' sequence. With this method, no need for the 'configurationID' field.

Figure 4:
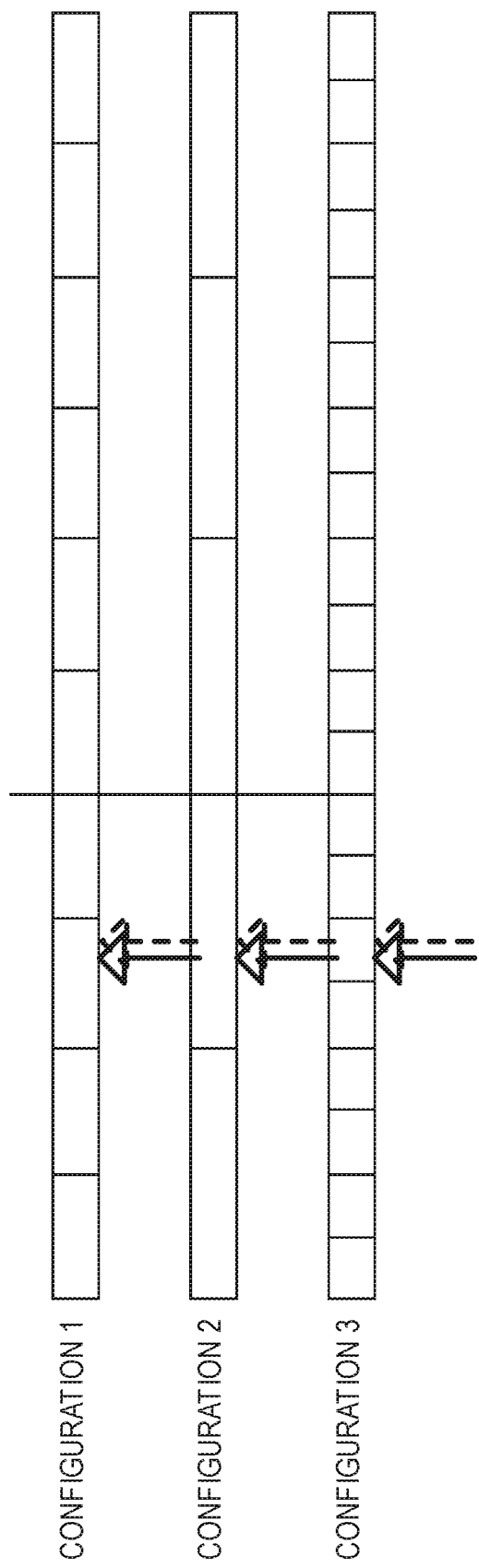
FIG. 4 illustrates example traffic arriving with three different configurations, according to some embodiments of the present disclosure.

Using the above embodiments, how the proposed algorithm can accommodate both URLLC and eMBB traffics while satisfying the latency requirement and improving the spectral efficiency is described. FIG. 4 shows that the arrival of two traffic (dotted and solid, i.e., URLLC and eMBB), while UE have three configurations. Obviously, such three configurations are not possible with current state of the art. That is, even if the 'timeDomainOffset' for different configurations (with the same slot length) is changed, the URLLC requirement cannot be met while improving the spectral efficiency. However, this solution enables us to choose Configuration 1 if the URLLC is satisfied with the resulted latency. The spectral efficiency of configuration 1 is much better than that of configuration 3. Of course, the UE might not choose configuration 2, because it increases the misalignment delay (discussed in more detail below).

An important implication of such solution is that it can mitigate the jitter (misalignment, time fluctuation in the data arrival to the UE, before it is transmitted through the antenna port) which might be introduced by TSN traffic. In an alternative embodiment of this solution, some embodiments enable the support of variable frequency allocation among these configurations. Hence, if data arrived late (in compared to its original schedule) UE uses shortest mini-slot with highest frequency allocation. Otherwise, if data arrived early, UE uses CG configuration with flexible time and frequency allocation.

Figure 5:
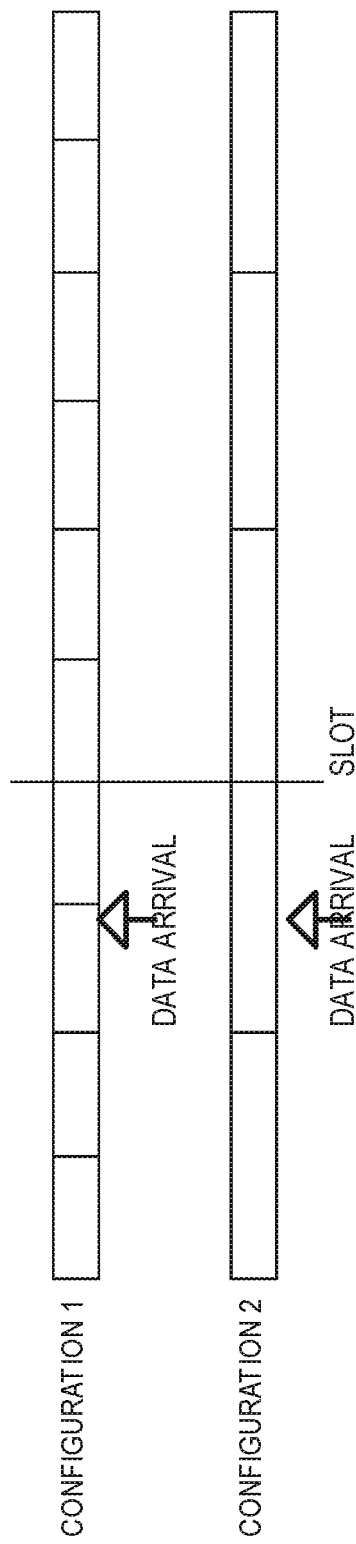
FIG. 5 illustrates example traffic arriving with different configurations, some near a slot border, according to some embodiments of the present disclosure.

Some embodiments disclosed herein can reduce the alignment delay in slot border as well. To explain it, consider a UE that is configured by only configuration 2, as shown in FIG. 5. Assume data arrives in the middle of T0 in configuration 2. Then data cannot be transmitted on that slot. However, if there are multiple configurations with different sizes, for example a configuration with smaller TTI-length as configuration 1 in FIG. 5, then data can be transmitted in next TTI in configuration 1. This can reduce the alignment delay.

An issue with this solution is how to inform the gNB about the used configuration, especially when switching between configurations without the knowledge of gNB. One example of such information is that the UE implicitly sends such information using the DMRS sequence, which can be orthogonal in between configurations. More details are included below.

As an illustration of different pattern Configurations, let the packet generation consist of several periodic components with periods P1, P2, . . . and time offsets t1, t2, . . . . This means that there will be a period P for the packet generation pattern; for example, if a first component has three period slots and one time offset, and a second component has five period slots and three time offsets. The packet generation pattern for the first component looks like:

010010010010010010 . . .

and packet generation pattern for second component looks like:

000100001000010 . . .

In this embodiments, the pattern for the total aggregate looks like:

010110011010020010110011010020010011 . . .

That is, the period of the aggregate is 15 slots. The greatest common factor of the periods of the components will be period of the aggregate. In some embodiments, the configuredGrantPattern is a bitmap indicating pattern within the period. This would enable to set a configuredGrantPattern such that the occasions where two or more packets are generated during same transmission occasions. For the example above, one can specify a pattern 010110011010011, i.e. adding one consecutive transmission occasions where the "2" (or a higher number) appears in the traffic generation pattern. The ConfiguredGrantConfig may be modified with highlighted part below:

```
ConfiguredGrantConfig ::=        SEQUENCE {
  frequencyHopping                   ENUMERATED {mode1, mode2} OPTIONAL, -- Need S,
  cg-DMRS-Configuration              DMRS-UplinkConfig,
  mcs-Table              ENUMERATED {qam256, spare1} OPTIONAL, -- Need S
  mcs-TableTransformPrecoder         ENUMERATED {qam256, spare1} OPTIONAL, -- Need S
  uci-OnPUSCH                        SetupRelease { CG-UCI-OnPUSCH },
  resourceAllocation                 ENUMERATED { resourceAllocationType0, resourceAllocationType1, dynamicSwitch },
  rbg-Size                      ENUMERATED {config2} OPTIONAL, -- Need S
  powerControlLoopToUse              ENUMERATED {n0, n1},
  p0-PUSCH-Alpha                     P0-PUSCH-AlphaSetId,
  transformPrecoder                  ENUMERATED {enabled} OPTIONAL, -- Need S
  nrofHARQ-Processes                 INTEGER(1..16),
  repK                  ENUMERATED {n1, n2, n4, n8},
  repK-RV                            ENUMERATED {s1-0231, s2-0303, s3-0000} OPTIONAL, -- Cond RepK
  periodicity                        ENUMERATED {
    sym2, sym7, sym1x14, sym2x14, sym4x14, sym5x14, sym8x14, sym10x14, sym16x14,
sym20x14, sym32x14, sym40x14, sym64x14, sym80x14, sym128x14, sym160x14, sym256x14, sym320x14, sym512x14,
sym640x14, sym1024x14, sym1280x14, sym2560x14, sym5120x14, sym6, sym1x12, sym2x12, sym4x12, sym5x12, sym8x12,
sym10x12, sym16x12, sym20x12, sym32x12, sym40x12, sym64x12, sym80x12, sym128x12, sym160x12, sym256x12,
sym320x12, sym512x12, sym640x12, sym1280x12, sym2560x12
    },
  configuredGrantPattern             BITMAP(1..X)
  configuredGrantTimer           INTEGER (1..64) OPTIONAL, -- Need R
  rrc-ConfiguredUplinkGrant          SEQUENCE {
    timeDomainOffset                 INTEGER (0..5119),
    timeDomainAllocation             INTEGER (0..15),
    frequencyDomainAllocation        BIT STRING (SIZE(18)),
      antennaPort                    INTEGER (0..31),
      dmrs-SeqInitialization             INTEGER (0..1) OPTIONAL, -- Cond NoTransformPrecoder
      precodingAndNumberOfLayers         INTEGER (0..63),
      srs-ResourceIndicator          INTEGER (0..15),
    mcsAndTBS              INTEGER (0..31),
    frequencyHoppingOffset             INTEGER (1..maxNrofPhysicalResourceBlocks-1) OPTIONAL, -- Need M
    pathlossReferenceIndex             INTEGER (0..maxNrofPUSCH-PathlossReferenceRSs-1),
    ...
}                                       OPTIONAL -- Need R
```

In other embodiments, the period in ConfiguredGrantConfig is extended to a list of periods. In such embodiments, a list of time offsets is added to ConfiguredGrantConfig.

In other embodiments, packets are generated with a period P but there is delay jitter until the packets arrive in UE buffer. In such embodiments, the configuredGrantPattern may indicate multiple transmission occasions for the configured grant. For example, if period equals P then the configuredGrantPattern may indicate that the transmission occasions starts at time locations.

$$N*P-2*t\_offset, N*P-t\_offset, N*P, N*P+t\_offset, N*P+2*t\_offset.$$

In some embodiments the t_offset is the length L (in symbols) of the transmission. The configuredGrant pattern may in such embodiments be an absolute value, for example the value 2. The possible start locations S for the configured grant by hence be S-2*L, S-L, S, S+L and S+2*L which is repeated with a period P which may be several slots.

Flexible Configured Grant (FCG) for Efficient Resource Mapping

The above proposals enable the activation of multiple configurations. However, if there is a mix of many deterministic traffic patterns per a device (e.g., Industrial Robot arm) it might result in increasing the number of HARQ processes. The current HARQ process number is limited by the specification as in TS 38.214:

"For uplink, 16 HARQ processes per cell are supported by the UE."

This number of HARQ processes limits the number of configurations that can be had in a configured grant. Therefore, it limits the number of traffics that can be mixed per device. In the following, some embodiments propose a solution to such limitation.

Figure 6:
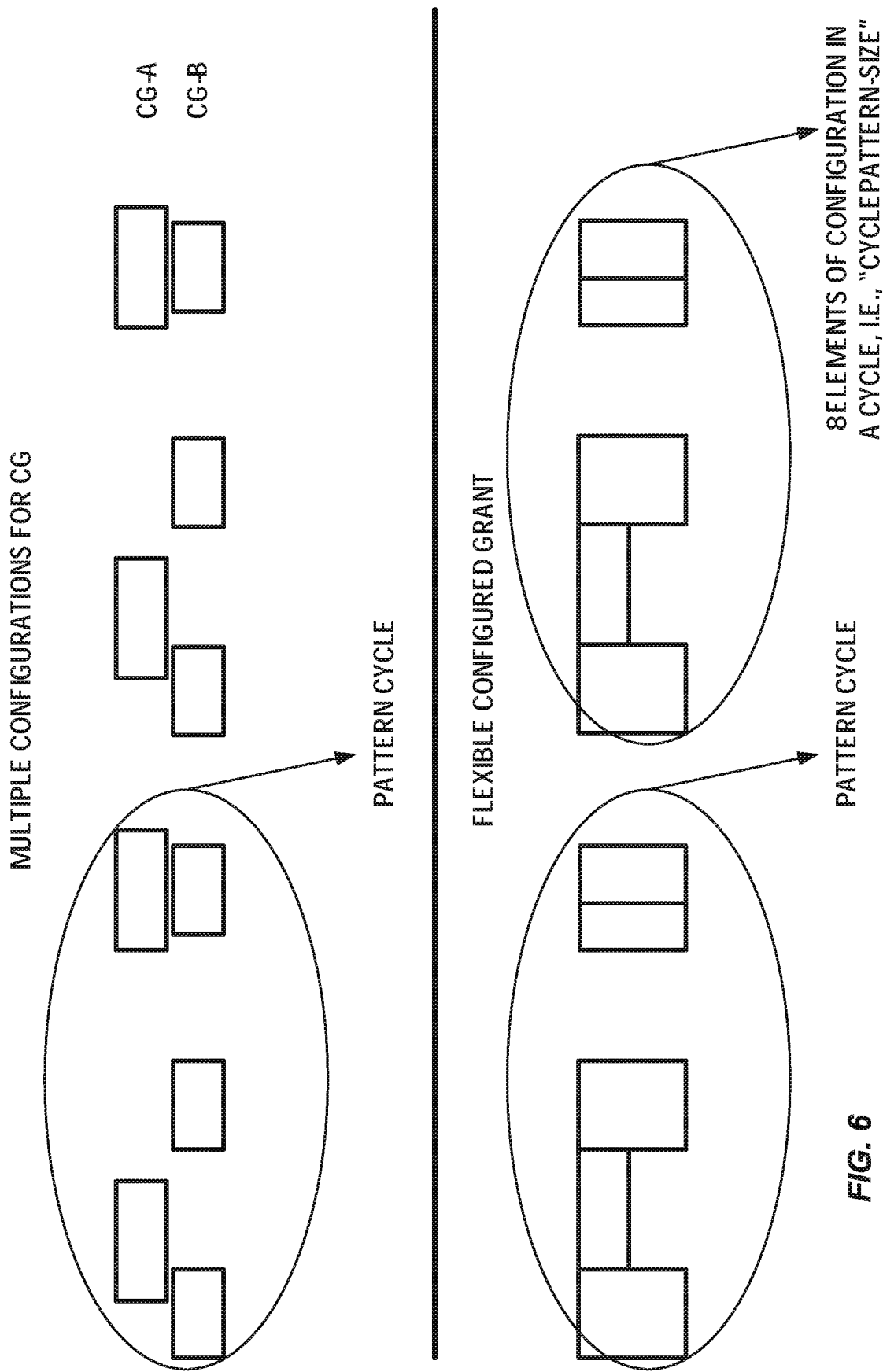
FIG. 6 illustrates an example of multiple configurations and a corresponding flexible configured grant, according to some embodiments of the present disclosure.

In one embodiment, it is proposed to have a flexible configured grant that have a sequence of pre-determined parameters, yet it belongs to a single Configured-Grant configuration process. FIG. 6 describes the simple idea of flexible configured grant, where the two configurations, i.e., CG-A and CG-B, are combined into one FCG. Such that after combination, there are two periods of FCG and eight elements in each cycle. In order to enable such configuration:

1. Under Type 1: each RRC parameter will have several sequences, each consisting of several elements. Each element represents the potential choice of the configuration parameter at the transmission interval. The mechanism of making such a choice is explained later in this section.

An example describing this point is given below. For instance the current specification of CG parameters is specified as mcsAndTBS INTEGER (0 . . . 31), However, some embodiments propose to change it to accommodate a sequence depending on the union of multiple configuration, for example it can be expressed as

```
mcsAndTBS       choice{SEQUENCE(1..CyclePattern-Size),
                SEQUENCE(1.. CyclePattern-Size), }....},
```

For example, some embodiments will have the following choices of sequences (each of CyclePattern-Size=8 elements), the UE choose one among them.

{0,5, 20, 3, 30,4, 8,6}, {1,7, 30, 20, 3, 4, 8,6}, . . .

The new parameter CyclePattern-Size is the number of elements at each sequence option that the configuration parameter can take within one cycle at the FCG. In the example of FIG. 6, CyclePattern-Size=8.

2. Under Type 2: similar methodology can be done for Type 2, however, for signals that require the DCI activation/de-activation, some embodiments suggest (in one solution) to change the DCI signal type (possibly with the same number of bits) such that it chooses among the MCS/Transport Block Size (TBS) sequences mentioned above. That is, the DCI signal will be used as index for the RRC (sequence) parameter.

Similar assignments can be done for other configuration parameters, i.e., frequency/time allocation, repK, resourceAllocation, periodicity, frequency hopping pattern, etc. FIG. 6 illustrates the simple idea of flexible configured grant.

In a follow up embodiment, it is proposed to include new combination (union) rules for combining the parameters of multiple configured grants configuration, e.g., Configuration CG-A and Configuration CG-B. For the purpose of illustration, Table 3 describes a set of potential combination rules between CG-A and CG-B for a set of parameters, e.g., MCS, repK, Time-Domain, and Resource Block (RB) assignment. There might more parameters to be considered, such as, frequency Hopping, CG-DMRS-Configuration, p0-PUSCH-Alpha, etc. Union rules can be made for all them in a similar methodology to those in Table 3. It is essential to note that this decision should be made for each of the configuration cycle elements (there are eight elements in the above example in FIG. 6).

In one solution, gNB makes the decision on how to use the rules, or enables the UE (partially) to make the decision, or gives full control to the UE to choose among these rules.

To support the flexible CG, some embodiments propose changing the main MAC transmission equations, in 3GPP TS 38.321, e.g.:

"After an uplink grant is configured for a configured grant Type 2, the MAC entity shall consider sequentially that the $N^{th}$ uplink grant occurs associated with the symbol for which:

[(SFN×numberOfSlotsPerFrame×numberOfSymbolsPerSlot)+(slot number in the frame×numberOfSymbolsPerSlot)+symbol number in the slot]=[(SFN$_{start\ time}$×numberOfSlotsPerFrame×numberOfSymbolsPerSlot+slot$_{start\ time}$×numberOfSymbolsPerSlot+symbol$_{start\ time}$)+$N$×periodicity]modulo(1024×numberOfSlotsPerFrame×numberOfSymbolsPerSlot)

where SFN$_{start\ time}$, slot$_{start\ time}$, and symbol$_{start\ time}$ are the SFN, slot, and symbol, respectively, of the first transmission of PUSCH where the configured uplink grant was (re-)initialised."

Since there are different ways of modifying such a function, some embodiments leave it up to the detailed implementation of these embodiments to decide on the implementation way of this equation.

Handling Retransmission, Activation/De-Activation Associated with Multiple UL Configured Grants When multiple UL configured grants are present, there is a need to distinguish which GF a retransmission is associated with and which HARQ process ID it should use. Also if there is a need to separately activate/deactivate each Type 2 configuration, the corresponding mechanism needs to be defined. Currently, both retransmission and activation/de-activation of UL GFs are signaled via DCI.

Alternative 1. Introduce GF_Process ID Field to DCI Formats

In one alternative, all active GFs (including Type 1 and Type 2) share the single CS-RNTI as in Rel-15. A GF_process ID field is added in the DCI to indicate which GF process the DCI is associated with. This is added in DCI formats for both the purposes of retransmission, as well as activation/de-activation.

For example, if a maximum of two GFs are allowed to be active, a GF_process ID field of 1 bit is introduced to DCI. When GF_process ID=0, the DCI provides information for GF #0; when GF_process ID=1, the DCI provides information for GF #1. Other DCI fields can be used, for example, as activation of GF #1 is indicated by the following set up in DCI:

GF_process ID=1, New Data Indicator (NDI)=0, HARQ process number=all '0's, redundancy version=all '0's If only one GF is configured by RRC to be active, but a maximum of two GFs are allowed to be active, then by

TABLE 3

Rules for Combining the Parameters of two CG Configurations into FCG:

| CG Parameters | LCHs | Configuration A | Configuration B | UE Combination Rule | |
|---|---|---|---|---|---|
| MCS (DCI) | LCH 1 | MCS 0-31 (0-3) = 1 | >1 | For RB-A uses MCS2 | Min(MCS-A, MCS-B) |
| | LCH 2 | <20 | MCS 20 (0→31) | For RB-B uses MCS20 | |
| repK | LCH 1 | 3 | | Max(A, B) at RB-A and min(A, B) at RB-B | Max(A, B) |
| | LCH 2 | | 0-1 | | |
| Periodicity | LCH 1 | 3 | | 2 (in the example above) depending on the individual pattern of all configurations | |
| | LCH 2 | | 4 | | |
| Time-Domain | LCH 1 | 2os or 4os | | Min(TD-A, TD-B) | Max(TD-A, TD-B) |
| | LCH 2 | | 8os or 14os? | Two MAC PDUs: (a) 2os (b) 8os PHY push them to different RBs | |
| RB Assignment | LCH 1 (RB-A) | 4 RBG (RB-A) | | Union(A, B) | |
| | LCH 2 (RB-B) | | 2 RBG (RB-B) | | | default, GF_process ID=0 is used in the DCI. Additionally, this can be used in PDCCH validation, i.e., if only one GF is active, but GF_process_ID=1, then the received DCI is invalid.

Similarly, if a maximum of four GFs are allowed to be active, a GF_process ID field of 2 bit is introduced to DCI. For instance, GF_process_ID='00101110111' indicates GF #0, GF #1, GF #2, GF #3, respectively.

Alternative 2. Introduce More CS-RNTI

In another alternative, more CS-RNTIs are introduced.

Currently, only one RNTI is defined for UL grant free transmission, i.e., CS-RNTI. When multiple configurations are defined, more CS-RNTIs may be introduced to differentiate them.

For example, if two GFs are allowed to be active at the same time, then two RNTI are defined for UL grant free transmission: CS-RNTI and CS-enhance-RNTI. CS-RNTI is associated with GF #0, and CS-enhance-RNTI is associated with GF #1. The relevant RNTI is used for both the purposes of retransmission, as well as activation/de-activation. When the DCI transmissions associated with both GF #0 and GF1 are possible at one PDCCH monitoring occasion, the UE needs to descramble the Cyclic Redundancy Check (CRC) bits of DCI with both CS-RNTI and CS-enhance-RNTI, respectively, to see which RNTI has been used in the DCI transmission.

For example, activation of GF #1 is indicated by the following set up in DCI:

RNTI=CS-enhance-RNTI, NDI=0, HARQ process number=all '0's, redundancy version=all '0's Similarly, if four GFs are allowed to be active at the same time, then three RNTI are defined: CS-RNTI and {CS-enhance1-RNTI, CS-enhance2-RNTI, CS-enhance3-RNT}. CS-RNTI is associated with GF #0, and {CS-enhance1-RNTI, CS-enhance2-RNTI, CS-enhance3-RNT} is associated with GF #1, GF #2, GF #3, respectively.

Alternative 3:

In some embodiments, there are multiple configured grants, i.e., Type 2 "processes," but a common CS-RNTI. In such embodiments, the HARQ process number and/or redundancy version field in activation DCI may indicate the configured grant "process". For example, reception of a DCI scrambled with CS-RNTI, NDI=0, HARQ process number='0001', Redundancy Version (RV)=all '0's may indicate activation of the configured grant defined by second row/entry in a table/list of configured grants. Thus, different configured grants may be addressed using a single CS-RNTI but having different time-frequency allocation and/or transport format (e.g., rank, number of layers, MCS, pre-coder, etc.).

Alternative 4:

In an alternative solution to activate the specific sequence of each configuration parameter, some embodiments suggest (in one solution) to change the DCI signal type (possibly with the same number of bits) such that the DCI chooses among the MCS/Transport Block Size (TBS) sequences mentioned in section 5.2. That is, the DCI signal will be used as index for the RRC (sequence) parameter.

Figure 7:
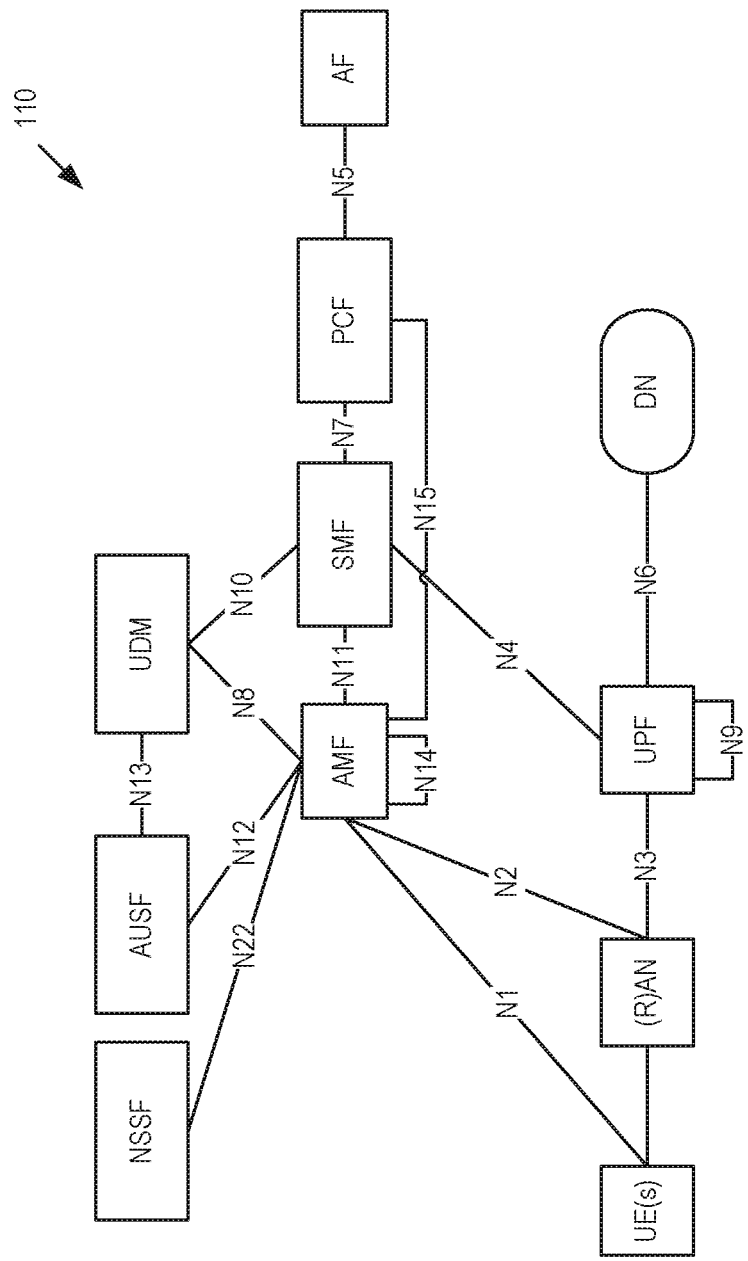
FIG. 7 illustrates a wireless communication system represented as a 5G network architecture composed of core Network Functions (NFs), where interaction between any two NFs is represented by a point-to-point reference point/interface, according to some embodiments of the present disclosure.

FIG. 7 illustrates a wireless communication system represented as a 5G network architecture composed of core Network Functions (NFs), where interaction between any two NFs is represented by a point-to-point reference point/interface. FIG. 7 can be viewed as one particular implementation of the system 100 of FIG. 1.

Seen from the access side the 5G network architecture shown in FIG. 7 comprises a plurality of User Equipment (UEs) connected to either a Radio Access Network (RAN) or an Access Network (AN) as well as an Access and Mobility Management Function (AMF). Typically, the R(AN) comprises base stations, e.g. such as evolved Node Bs (eNBs) or 5G base stations (gNBs) or similar. Seen from the core network side, the 5G core NFs shown in FIG. 7 include a Network Slice Selection Function (NSSF), an Authentication Server Function (AUSF), a Unified Data Management (UDM), an AMF, a Session Management Function (SMF), a Policy Control Function (PCF), and an Application Function (AF).

Reference point representations of the 5G network architecture are used to develop detailed call flows in the normative standardization. The N1 reference point is defined to carry signaling between the UE and AMF. The reference points for connecting between the AN and AMF and between the AN and UPF are defined as N2 and N3, respectively. There is a reference point, N11, between the AMF and SMF, which implies that the SMF is at least partly controlled by the AMF. N4 is used by the SMF and UPF so that the UPF can be set using the control signal generated by the SMF, and the UPF can report its state to the SMF. N9 is the reference point for the connection between different UPFs, and N14 is the reference point connecting between different AMFs, respectively. N15 and N7 are defined since the PCF applies policy to the AMF and SMP, respectively. N12 is required for the AMF to perform authentication of the UE. N8 and N10 are defined because the subscription data of the UE is required for the AMF and SMF.

The 5G core network aims at separating user plane and control plane. The user plane carries user traffic while the control plane carries signaling in the network. In FIG. 7, the UPF is in the user plane and all other NFs, i.e., the AMF, SMF, PCF, AF, AUSF, and UDM, are in the control plane. Separating the user and control planes guarantees each plane resource to be scaled independently. It also allows UPFs to be deployed separately from control plane functions in a distributed fashion. In this architecture, UPFs may be deployed very close to UEs to shorten the Round Trip Time (RTT) between UEs and data network for some applications requiring low latency.

The core 5G network architecture is composed of modularized functions. For example, the AMF and SMF are independent functions in the control plane. Separated AMF and SMF allow independent evolution and scaling. Other control plane functions like the PCF and AUSF can be separated as shown in FIG. 7. Modularized function design enables the 5G core network to support various services flexibly.

Each NF interacts with another NF directly. It is possible to use intermediate functions to route messages from one NF to another NF. In the control plane, a set of interactions between two NFs is defined as service so that its reuse is possible. This service enables support for modularity. The user plane supports interactions such as forwarding operations between different UPFs.

Figure 8:
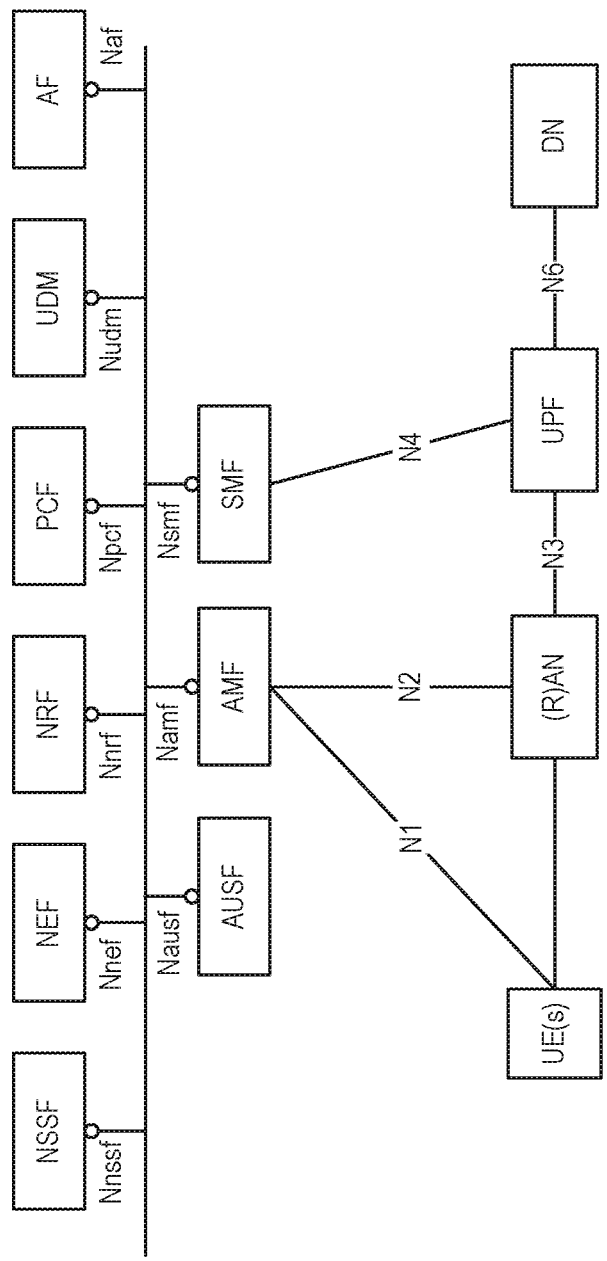
FIG. 8 illustrates a 5G network architecture using service-based interfaces between the NFs in the control plane, instead of the point-to-point reference points/interfaces used in the 5G network architecture of FIG. 7, according to some embodiments of the present disclosure.

FIG. 8 illustrates a 5G network architecture using service-based interfaces between the NFs in the control plane, instead of the point-to-point reference points/interfaces used in the 5G network architecture of FIG. 7. However, the NFs described above with reference to FIG. 7 correspond to the NFs shown in FIG. 8. The service(s) etc. that a NF provides to other authorized NFs can be exposed to the authorized NFs through the service-based interface. In FIG. 8 the service based interfaces are indicated by the letter "N" followed by the name of the NF, e.g. Namf for the service based interface of the AMF and Nsmf for the service based interface of the SMF etc. The Network Exposure Function (NEF) and the Network Repository Function (NRF) in FIG. 8 are not shown in FIG. 7 discussed above. However, it should be clarified that all NFs depicted in FIG. 7 can interact with the NEF and the NRF of FIG. 8 as necessary, though not explicitly indicated in FIG. 7.

Some properties of the NFs shown in FIGS. 4 and 5 may be described in the following manner. The AMF provides UE-based authentication, authorization, mobility management, etc. A UE even using multiple access technologies is basically connected to a single AMF because the AMF is independent of the access technologies. The SMF is responsible for session management and allocates Internet Protocol (IP) addresses to UEs. It also selects and controls the UPF for data transfer. If a UE has multiple sessions, different SMFs may be allocated to each session to manage them individually and possibly provide different functionalities per session. The AF provides information on the packet flow to the PCF responsible for policy control in order to support Quality of Service (QoS). Based on the information, the PCF determines policies about mobility and session management to make the AMF and SMF operate properly. The AUSF supports authentication function for UEs or similar and thus stores data for authentication of UEs or similar while the UDM stores subscription data of the UE. The Data Network (DN), not part of the 5G core network, provides Internet access or operator services and similar.

An NF may be implemented either as a network element on a dedicated hardware, as a software instance running on a dedicated hardware, or as a virtualized function instantiated on an appropriate platform, e.g., a cloud infrastructure.

Figure 9:
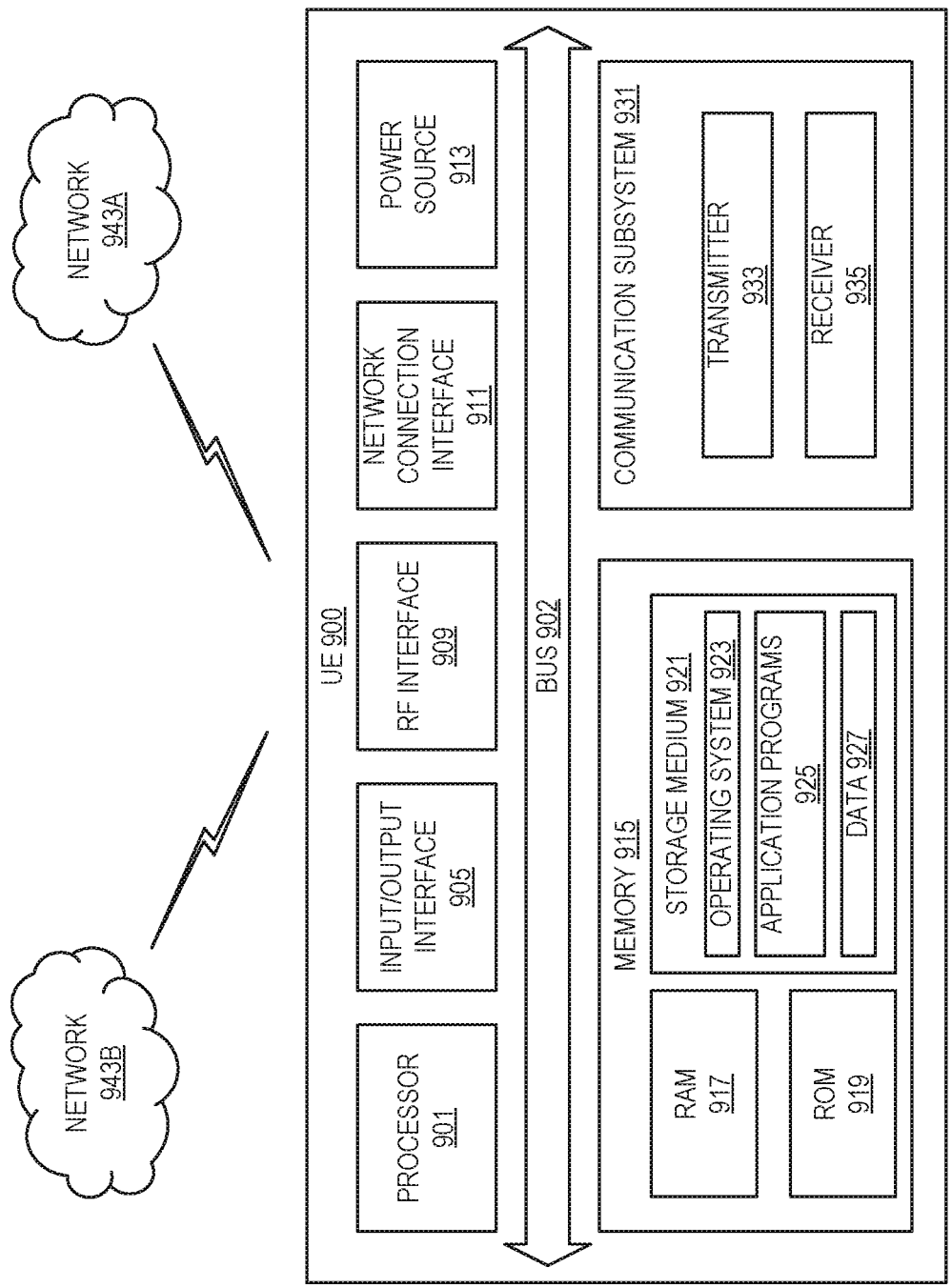
FIG. 9 illustrates one embodiment of a UE, according to some embodiments of the present disclosure.

FIG. 9 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). A UE 900 may be any UE identified by 3GPP, including a NB-IoT UE, a MTC UE, and/or an enhanced MTC (eMTC) UE. The UE 900, as illustrated in FIG. 9, is one example of a WD configured for communication in accordance with one or more communication standards promulgated by 3GPP, such as 3GPP's GSM, UMTS, LTE, and/or 5G standards. As mentioned previously, the term WD and UE may be used interchangeable. Accordingly, although FIG. 9 is a UE, the components discussed herein are equally applicable to a WD, and vice-versa.

In FIG. 9, the UE 900 includes processing circuitry 901 that is operatively coupled to an input/output interface 905, an RF interface 909, a network connection interface 911, memory 915 including RAM 917, ROM 919, and a storage medium 921 or the like, a communication subsystem 931, a power source 913, and/or any other component, or any combination thereof. The storage medium 921 includes an operating system 923, an application program 925, and data 927. In other embodiments, the storage medium 921 may include other similar types of information. Certain UEs may utilize all of the components shown in FIG. 9, or only a subset of the components. The level of integration between the components may vary from one UE to another UE. Further, certain UEs may contain multiple instances of a component, such as multiple processors, memories, transceivers, transmitters, receivers, etc.

In FIG. 9, the processing circuitry 901 may be configured to process computer instructions and data. The processing circuitry 901 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored programs, general purpose processors, such as a microprocessor or DSP, together with appropriate software; or any combination of the above. For example, the processing circuitry 901 may include two CPUs. Data may be information in a form suitable for use by a computer.

In the depicted embodiment, the input/output interface 905 may be configured to provide a communication interface to an input device, output device, or input and output device. The UE 900 may be configured to use an output device via the input/output interface 905. An output device may use the same type of interface port as an input device. For example, a USB port may be used to provide input to and output from the UE 900. The output device may be a speaker, a sound card, a video card, a display, a monitor, a printer, an actuator, an emitter, a smartcard, another output device, or any combination thereof. The UE 900 may be configured to use an input device via the input/output interface 905 to allow a user to capture information into the UE 900. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 9, the RF interface 909 may be configured to provide a communication interface to RF components such as a transmitter, a receiver, and an antenna. The network connection interface 911 may be configured to provide a communication interface to a network 943A. The network 943A may encompass wired and/or wireless networks such as a LAN, a WAN, a computer network, a wireless network, a telecommunications network, another like network or any combination thereof. For example, the network 943A may comprise a WiFi network. The network connection interface 911 may be configured to include a receiver and a transmitter interface used to communicate with one or more other devices over a communication network according to one or more communication protocols, such as Ethernet, Transmission Control Protocol (TCP)/IP, Synchronous Optical Networking (SONET), Asynchronous Transfer Mode (ATM), or the like. The network connection interface 911 may implement receiver and transmitter functionality appropriate to the communication network links (e.g., optical, electrical, and the like). The transmitter and receiver functions may share circuit components, software, or firmware, or alternatively may be implemented separately.

The RAM 917 may be configured to interface via a bus 902 to the processing circuitry 901 to provide storage or caching of data or computer instructions during the execution of software programs such as the operating system, application programs, and device drivers. The ROM 919 may be configured to provide computer instructions or data to the processing circuitry 901. For example, the ROM 919 may be configured to store invariant low-level system code or data for basic system functions such as basic Input and Output (I/O), startup, or reception of keystrokes from a keyboard that are stored in a non-volatile memory. The Storage medium 921 may be configured to include memory such as RAM, ROM, Programmable ROM (PROM), Erasable PROM (EPROM), Electrically EPROM (EEPROM), magnetic disks, optical disks, floppy disks, hard disks, removable cartridges, or flash drives. In one example, the storage medium 921 may be configured to include the operating system 923, the application program 925 such as a web browser application, a widget or gadget engine, or another application, and the data file 927. The storage medium 921 may store, for use by the UE 900, any of a variety of various operating systems or combinations of operating systems.

The storage medium 921 may be configured to include a number of physical drive units, such as a Redundant Array of Independent Disks (RAID), a floppy disk drive, flash memory, a USB flash drive, an external hard disk drive, a thumb drive, a pen drive, a key drive, a High-Density Digital Versatile Disc (HD-DVD) optical disc drive, an internal hard disk drive, a Blu-Ray optical disc drive, a Holographic Digital Data Storage (HDDS) optical disc drive, an external mini-Dual In-Line Memory Module (DIMM), Synchronous Dynamic RAM (SDRAM), external micro-DIMM SDRAM, smartcard memory such as a Subscriber Identity Module (SIM) or a Removable User Identity (RUIM) module, other memory, or any combination thereof. The storage medium 921 may allow the UE 900 to access computer-executable instructions, application programs, or the like, stored on transitory or non-transitory memory media, to off-load data or to upload data. An article of manufacture, such as one utilizing a communication system, may be tangibly embodied in the storage medium 921, which may comprise a device readable medium.

In FIG. 9, the processing circuitry 901 may be configured to communicate with a network 943B using the communication subsystem 931. The network 943A and the network 943B may be the same network or networks or different network or networks. The communication subsystem 931 may be configured to include one or more transceivers used to communicate with the network 943B. For example, the communication subsystem 931 may be configured to include one or more transceivers used to communicate with one or more remote transceivers of another device capable of wireless communication such as another WD, UE, or base station of a Radio Access Network (RAN) according to one or more communication protocols, such as IEEE 802.9, Code Division Multiple Access (CDMA), WCDMA, GSM, LTE, Universal Terrestrial RAN (UTRAN), WiMax, or the like. Each transceiver may include a transmitter 933 and/or a receiver 935 to implement transmitter or receiver functionality, respectively, appropriate to the RAN links (e.g., frequency allocations and the like). Further, the transmitter 933 and the receiver 935 of each transceiver may share circuit components, software, or firmware, or alternatively may be implemented separately.

In the illustrated embodiment, the communication functions of the communication subsystem 931 may include data communication, voice communication, multimedia communication, short-range communications such as Bluetooth, near-field communication, location-based communication such as the use of the Global Positioning System (GPS) to determine a location, another like communication function, or any combination thereof. For example, the communication subsystem 931 may include cellular communication, WiFi communication, Bluetooth communication, and GPS communication. The network 943B may encompass wired and/or wireless networks such as a LAN, a WAN, a computer network, a wireless network, a telecommunications network, another like network, or any combination thereof. For example, the network 943B may be a cellular network, a WiFi network, and/or a near-field network. A power source 913 may be configured to provide Alternating Current (AC) or Direct Current (DC) power to components of the UE 900.

The features, benefits, and/or functions described herein may be implemented in one of the components of the UE 900 or partitioned across multiple components of the UE 900. Further, the features, benefits, and/or functions described herein may be implemented in any combination of hardware, software, or firmware. In one example, the communication subsystem 931 may be configured to include any of the components described herein. Further, the processing circuitry 901 may be configured to communicate with any of such components over the bus 902. In another example, any of such components may be represented by program instructions stored in memory that, when executed by the processing circuitry 901, perform the corresponding functions described herein. In another example, the functionality of any of such components may be partitioned between the processing circuitry 901 and the communication subsystem 931. In another example, the non-computationally intensive functions of any of such components may be implemented in software or firmware and the computationally intensive functions may be implemented in hardware.

Figure 10:
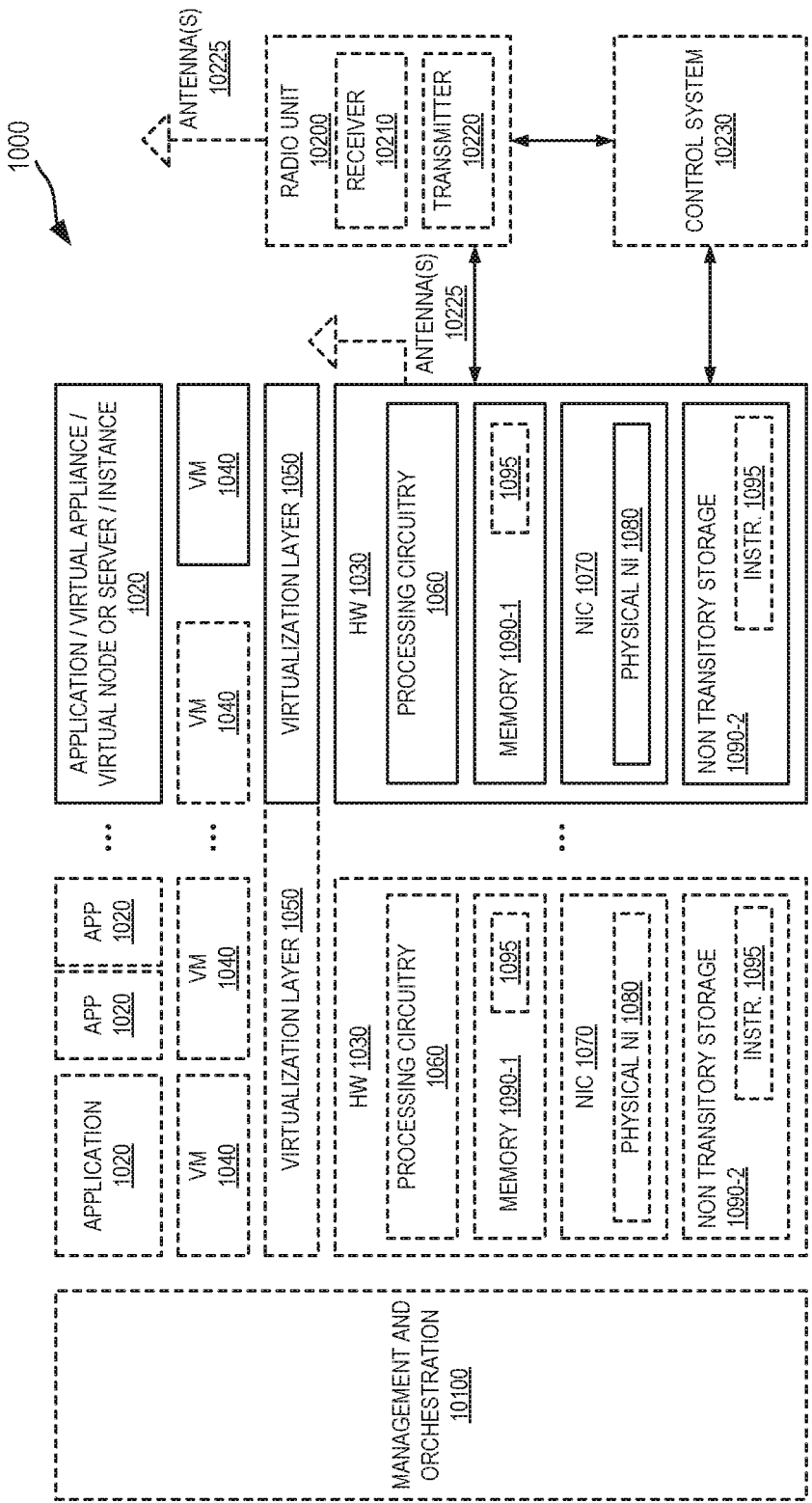
FIG. 10 is a schematic block diagram illustrating a virtualization environment 1000 in which functions implemented by some embodiments may be virtualized, according to some embodiments of the present disclosure.

FIG. 10 is a schematic block diagram illustrating a virtualization environment 1000 in which functions implemented by some embodiments may be virtualized. In the present context, virtualizing means creating virtual versions of apparatuses or devices which may include virtualizing hardware platforms, storage devices, and networking resources. As used herein, virtualization can be applied to a node (e.g., a virtualized base station or a virtualized radio access node) or to a device (e.g., a UE, a WD, or any other type of communication device) or components thereof and relates to an implementation in which at least a portion of the functionality is implemented as one or more virtual components (e.g., via one or more applications, components, functions, virtual machines, or containers executing on one or more physical processing nodes in one or more networks).

In some embodiments, some or all of the functions described herein may be implemented as virtual components executed by one or more virtual machines implemented in one or more virtual environments 1000 hosted by one or more of hardware nodes 1030. Further, in embodiments in which the virtual node is not a radio access node or does not require radio connectivity (e.g., a core network node), then the network node may be entirely virtualized.

The functions may be implemented by one or more applications 1020 (which may alternatively be called software instances, virtual appliances, network functions, virtual nodes, virtual network functions, etc.) operative to implement some of the features, functions, and/or benefits of some of the embodiments disclosed herein. The applications 1020 are run in the virtualization environment 1000 which provides hardware 1030 comprising processing circuitry 1060 and memory 1090. The memory 1090 contains instructions 1095 executable by the processing circuitry 1060 whereby the application 1020 is operative to provide one or more of the features, benefits, and/or functions disclosed herein.

The virtualization environment 1000 comprises general-purpose or special-purpose network hardware devices 1030 comprising a set of one or more processors or processing circuitry 1060, which may be Commercial Off-the-Shelf (COTS) processors, dedicated ASICs, or any other type of processing circuitry including digital or analog hardware components or special purpose processors. Each hardware device 1030 may comprise memory 1090-1 which may be non-persistent memory for temporarily storing instructions 1095 or software executed by the processing circuitry 1060. Each hardware device 1030 may comprise one or more Network Interface Controllers (NICs) 1070, also known as network interface cards, which include a physical network interface 1080. Each hardware device 1030 may also include non-transitory, persistent, machine-readable storage media 1090-2 having stored therein software 1095 and/or instructions executable by the processing circuitry 1060. The software 1095 may include any type of software including software for instantiating one or more virtualization layers 1050 (also referred to as hypervisors), software to execute virtual machines 1040, as well as software allowing it to execute functions, features, and/or benefits described in relation with some embodiments described herein.

The virtual machines 1040, comprise virtual processing, virtual memory, virtual networking or interface, and virtual storage, and may be run by a corresponding virtualization layer 1050 or hypervisor. Different embodiments of the instance of virtual appliance 1020 may be implemented on one or more of the virtual machines 1040, and the implementations may be made in different ways.

During operation, the processing circuitry 1060 executes the software 1095 to instantiate the hypervisor or virtualization layer 1050, which may sometimes be referred to as a Virtual Machine Monitor (VMM). The virtualization layer 1050 may present a virtual operating platform that appears like networking hardware to the virtual machine 1040.

As shown in FIG. 10, the hardware 1030 may be a standalone network node with generic or specific components. The hardware 1030 may comprise an antenna 10225 and may implement some functions via virtualization. Alternatively, the hardware 1030 may be part of a larger cluster of hardware (e.g., such as in a data center or CPE) where many hardware nodes work together and are managed via a Management and Orchestration (MANO) 10100, which, among others, oversees lifecycle management of the applications 1020.

Virtualization of the hardware is in some contexts referred to as Network Function Virtualization (NFV). NFV may be used to consolidate many network equipment types onto industry standard high volume server hardware, physical switches, and physical storage, which can be located in data centers and CPE.

In the context of NFV, the virtual machine 1040 may be a software implementation of a physical machine that runs programs as if they were executing on a physical, non-virtualized machine. Each of the virtual machines 1040, and that part of the hardware 1030 that executes that virtual machine 1040, be it hardware dedicated to that virtual machine 1040 and/or hardware shared by that virtual machine 1040 with others of the virtual machines 1040, forms a separate Virtual Network Element (VNE).

Still in the context of NFV, Virtual Network Function (VNF) is responsible for handling specific network functions that run in one or more virtual machines 1040 on top of the hardware networking infrastructure 1030 and corresponds to the application 1020 in FIG. 10.

In some embodiments, one or more radio units 10200 that each include one or more transmitters 10220 and one or more receivers 10210 may be coupled to the one or more antennas 10225. The radio units 10200 may communicate directly with the hardware nodes 1030 via one or more appropriate network interfaces and may be used in combination with the virtual components to provide a virtual node with radio capabilities, such as a radio access node or a base station.

In some embodiments, some signaling can be effected with the use of a control system 10230, which may alternatively be used for communication between the hardware nodes 1030 and the radio unit 10200.

Figure 11:
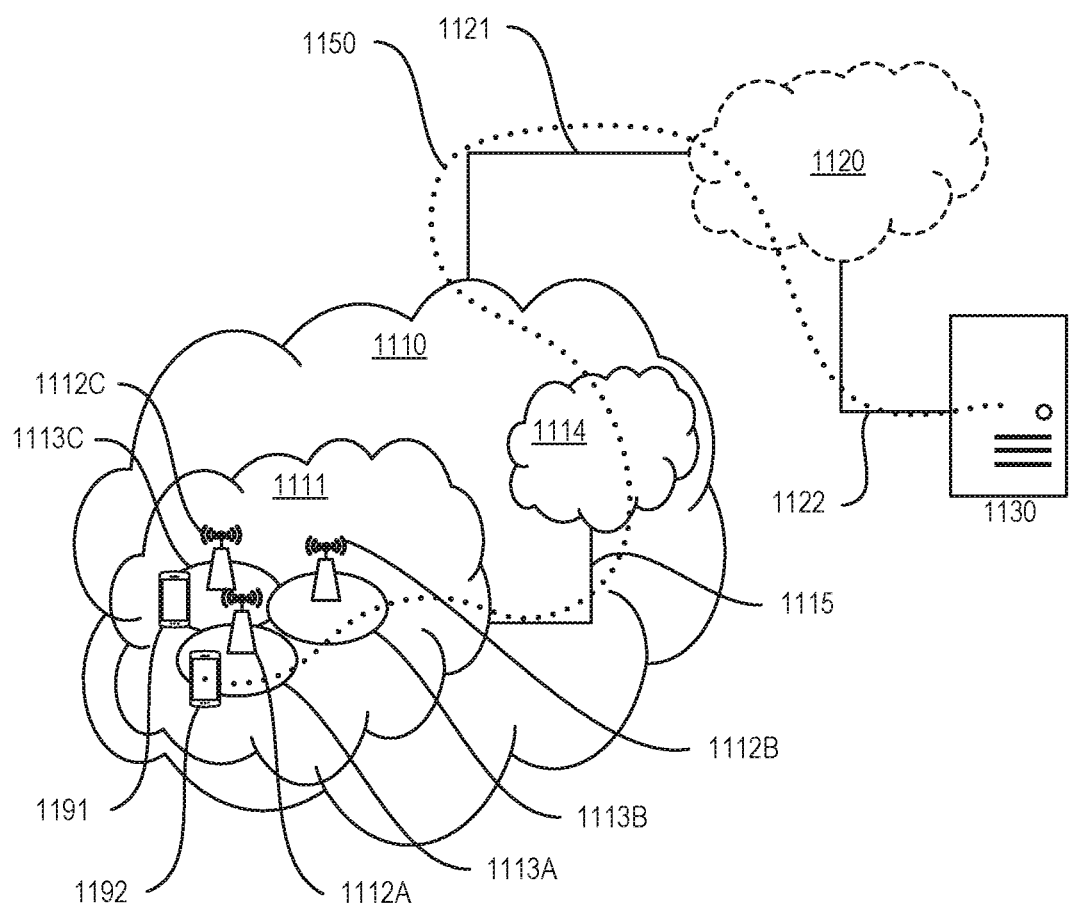
FIG. 11 illustrates a communication system including a telecommunication network, according to some embodiments of the present disclosure.

With reference to FIG. 11, in accordance with an embodiment, a communication system includes a telecommunication network 1110, such as a 3GPP-type cellular network, which comprises an access network 1111, such as a RAN, and a core network 1114. The access network 1111 comprises a plurality of base stations 1112A, 1112B, 1112C, such as NBs, eNBs, gNBs, or other types of wireless APs, each defining a corresponding coverage area 1113A, 1113B, 1113C. Each base station 1112A, 1112B, 1112C is connectable to the core network 1114 over a wired or wireless connection 1115. A first UE 1191 located in coverage area 1113C is configured to wirelessly connect to, or be paged by, the corresponding base station 1112C. A second UE 1192 in coverage area 1113A is wirelessly connectable to the corresponding base station 1112A. While a plurality of UEs 1191, 1192 are illustrated in this example, the disclosed embodiments are equally applicable to a situation where a sole UE is in the coverage area or where a sole UE is connecting to the corresponding base station 1112.

The telecommunication network 1110 is itself connected to a host computer 1130, which may be embodied in the hardware and/or software of a standalone server, a cloud-implemented server, a distributed server, or as processing resources in a server farm. The host computer 1130 may be under the ownership or control of a service provider, or may be operated by the service provider or on behalf of the service provider. Connections 1121 and 1122 between telecommunication network 1110 and the host computer 1130 may extend directly from the core network 1114 to the host computer 1130 or may go via an optional intermediate network 1120. The intermediate network 1120 may be one of, or a combination of more than one of, a public, private, or hosted network; the intermediate network 1120, if any, may be a backbone network or the Internet; in particular, the intermediate network 1120 may comprise two or more sub-networks (not shown).

The communication system of FIG. 11 as a whole enables connectivity between the connected UEs 1191, 1192 and the host computer 1130. The connectivity may be described as an Over-the-Top (OTT) connection 1150. The host computer 1130 and the connected UEs 1191, 1192 are configured to communicate data and/or signaling via the OTT connection 1150, using the access network 1111, the core network 1114, any intermediate network 1120, and possible further infrastructure (not shown) as intermediaries. The OTT connection 1150 may be transparent in the sense that the participating communication devices through which the OTT connection 1150 passes are unaware of routing of uplink and downlink communications. For example, the base station 1112 may not or need not be informed about the past routing of an incoming downlink communication with data originating from the host computer 1130 to be forwarded (e.g., handed over) to a connected UE 1191. Similarly, the base station 1112 need not be aware of the future routing of an outgoing uplink communication originating from the UE 1191 towards the host computer 1130.

Example implementations, in accordance with an embodiment, of the UE, base station, and host computer discussed in the preceding paragraphs will now be described with reference to FIG. 12. In a communication system 1200, a host computer 1210 comprises hardware 1215 including a communication interface 1216 configured to set up and maintain a wired or wireless connection with an interface of a different communication device of the communication system 1200. The host computer 1210 further comprises processing circuitry 1218, which may have storage and/or processing capabilities. In particular, the processing circuitry 1218 may comprise one or more programmable processors, ASICs, FPGAs, or combinations of these (not shown) adapted to execute instructions. The host computer 1210 further comprises software 1211, which is stored in or accessible by the host computer 1210 and executable by the processing circuitry 1218. The software 1211 includes a host application 1212. The host application 1212 may be operable to provide a service to a remote user, such as a UE 1230 connecting via an OTT connection 1250 terminating at the UE 1230 and the host computer 1210. In providing the service to the remote user, the host application 1212 may provide user data which is transmitted using the OTT connection 1250.

The communication system 1200 further includes a base station 1220 provided in a telecommunication system and comprising hardware 1225 enabling it to communicate with the host computer 1210 and with the UE 1230. The hardware 1225 may include a communication interface 1226 for setting up and maintaining a wired or wireless connection with an interface of a different communication device of the communication system 1200, as well as a radio interface 1227 for setting up and maintaining at least a wireless connection 1270 with the UE 1230 located in a coverage area (not shown in FIG. 12) served by the base station 1220. The communication interface 1226 may be configured to facilitate a connection 1260 to the host computer 1210. The connection 1260 may be direct or it may pass through a core network (not shown in FIG. 12) of the telecommunication system and/or through one or more intermediate networks outside the telecommunication system. In the embodiment shown, the hardware 1225 of the base station 1220 further includes processing circuitry 1228, which may comprise one or more programmable processors, ASICs, FPGAs, or combinations of these (not shown) adapted to execute instructions. The base station 1220 further has software 1221 stored internally or accessible via an external connection.

The communication system 1200 further includes the UE 1230 already referred to. The UE's 1230 hardware 1235 may include a radio interface 1237 configured to set up and maintain a wireless connection 1270 with a base station serving a coverage area in which the UE 1230 is currently located. The hardware 1235 of the UE 1230 further includes processing circuitry 1238, which may comprise one or more programmable processors, ASICs, FPGAs, or combinations of these (not shown) adapted to execute instructions. The UE 1230 further comprises software 1231, which is stored in or accessible by the UE 1230 and executable by the processing circuitry 1238. The software 1231 includes a client application 1232. The client application 1232 may be operable to provide a service to a human or non-human user via the UE 1230, with the support of the host computer 1210. In the host computer 1210, the executing host application 1212 may communicate with the executing client application 1232 via the OTT connection 1250 terminating at the UE 1230 and the host computer 1210. In providing the service to the user, the client application 1232 may receive request data from the host application 1212 and provide user data in response to the request data. The OTT connection 1250 may transfer both the request data and the user data. The client application 1232 may interact with the user to generate the user data that it provides.

Figure 12:
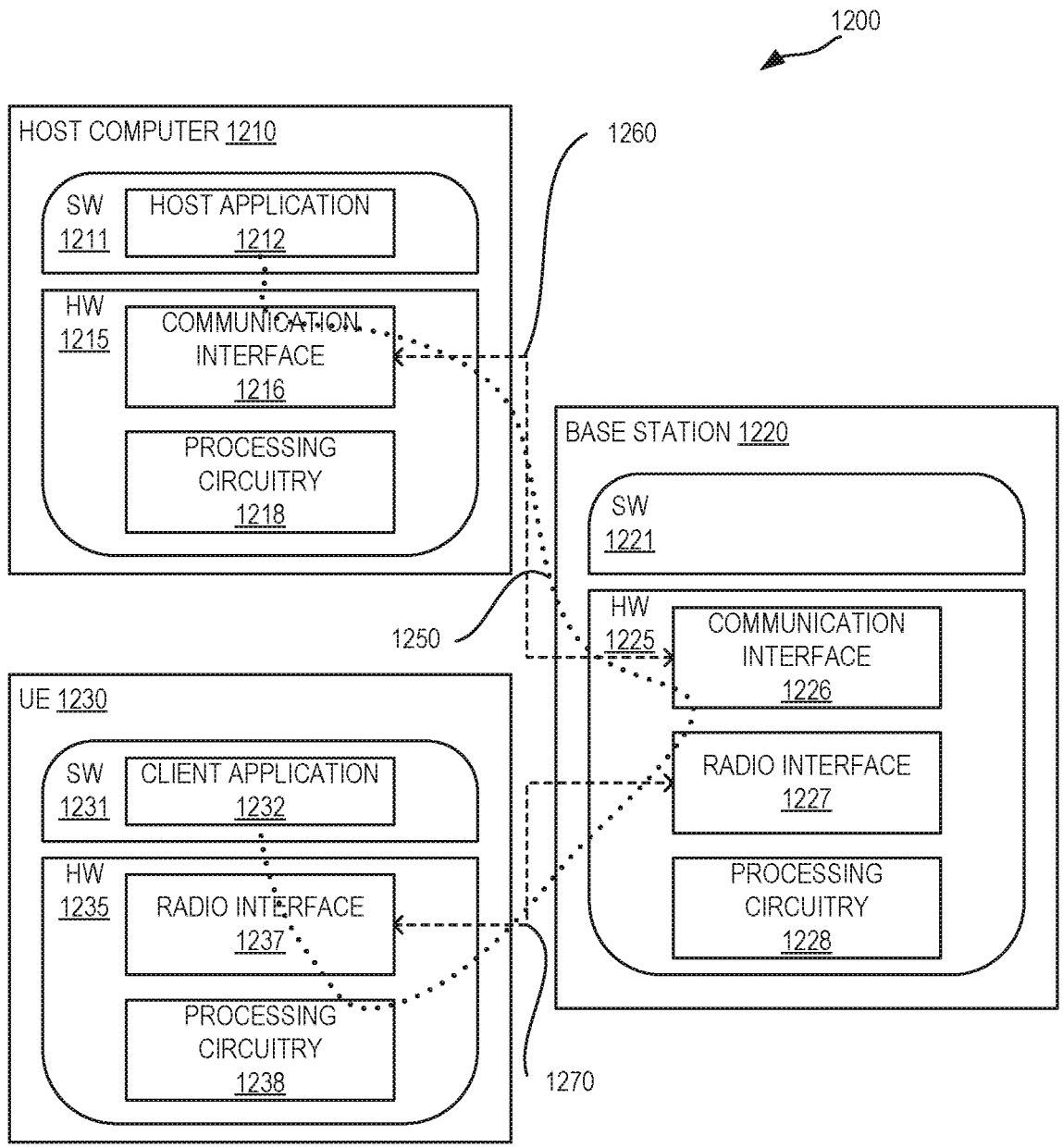
FIG. 12 illustrates a UE, base station, and host computer, according to some embodiments of the present disclosure.

It is noted that the host computer 1210, the base station 1220, and the UE 1230 illustrated in FIG. 12 may be similar or identical to the host computer 1130, one of the base stations 1112A, 1112B, 1112C, and one of the UEs 1191, 1192 of FIG. 11, respectively. This is to say, the inner workings of these entities may be as shown in FIG. 12 and independently, the surrounding network topology may be that of FIG. 11.

In FIG. 12, the OTT connection 1250 has been drawn abstractly to illustrate the communication between the host computer 1210 and the UE 1230 via the base station 1220 without explicit reference to any intermediary devices and the precise routing of messages via these devices. The network infrastructure may determine the routing, which may be configured to hide from the UE 1230 or from the service provider operating the host computer 1210, or both. While the OTT connection 1250 is active, the network infrastructure may further take decisions by which it dynamically changes the routing (e.g., on the basis of load balancing consideration or reconfiguration of the network).

The wireless connection 1270 between the UE 1230 and the base station 1220 is in accordance with the teachings of the embodiments described throughout this disclosure. One or more of the various embodiments improve the performance of OTT services provided to the UE 1230 using the OTT connection 1250, in which the wireless connection 1270 forms the last segment. More precisely, the teachings of these embodiments may improve the e.g., data rate, latency, power consumption and thereby provide benefits such as reduced user waiting time, etc.

A measurement procedure may be provided for the purpose of monitoring data rate, latency, and other factors on which the one or more embodiments improve. There may further be an optional network functionality for reconfiguring the OTT connection 1250 between the host computer 1210 and the UE 1230, in response to variations in the measurement results. The measurement procedure and/or the network functionality for reconfiguring the OTT connection 1250 may be implemented in the software 1211 and the hardware 1215 of the host computer 1210 or in the software 1231 and the hardware 1235 of the UE 1230, or both. In some embodiments, sensors (not shown) may be deployed in or in association with communication devices through which the OTT connection 1250 passes; the sensors may participate in the measurement procedure by supplying values of the monitored quantities exemplified above, or supplying values of other physical quantities from which the software 1211, 1231 may compute or estimate the monitored quantities. The reconfiguring of the OTT connection 1250 may include message format, retransmission settings, preferred routing, etc.; the reconfiguring need not affect the base station 1220, and it may be unknown or imperceptible to the base station 1220. Such procedures and functionalities may be known and practiced in the art. In certain embodiments, measurements may involve proprietary UE signaling facilitating the host computer 1210's measurements of throughput, propagation times, latency, and the like. The measurements may be implemented in that the software 1211 and 1231 causes messages to be transmitted, in particular empty or 'dummy' messages, using the OTT connection 1250 while it monitors propagation times, errors, etc.

FIG. 13 is a flowchart illustrating a method implemented in a communication system, in accordance with one embodiment. The communication system includes a host computer, a base station, and a UE which may be those described with reference to FIGS. 11 and 12. For simplicity of the present disclosure, only drawing references to FIG. 13 will be included in this section. In step 1310, the host computer provides user data. In sub-step 1311 (which may be optional) of step 1310, the host computer provides the user data by executing a host application. In step 1320, the host computer initiates a transmission carrying the user data to the UE. In step 1330 (which may be optional), the base station transmits to the UE the user data which was carried in the transmission that the host computer initiated, in accordance with the teachings of the embodiments described throughout this disclosure. In step 1340 (which may also be optional), the UE executes a client application associated with the host application executed by the host computer.

FIG. 14 is a flowchart illustrating a method implemented in a communication system, in accordance with one embodiment. The communication system includes a host computer, a base station, and a UE which may be those described with reference to FIGS. 11 and 12. For simplicity of the present disclosure, only drawing references to FIG. 14 will be included in this section. In step 1410 of the method, the host computer provides user data. In an optional sub-step (not shown) the host computer provides the user data by executing a host application. In step 1420, the host computer initiates a transmission carrying the user data to the UE. The transmission may pass via the base station, in accordance with the teachings of the embodiments described throughout this disclosure. In step 1430 (which may be optional), the UE receives the user data carried in the transmission.

Figures 15, 16:
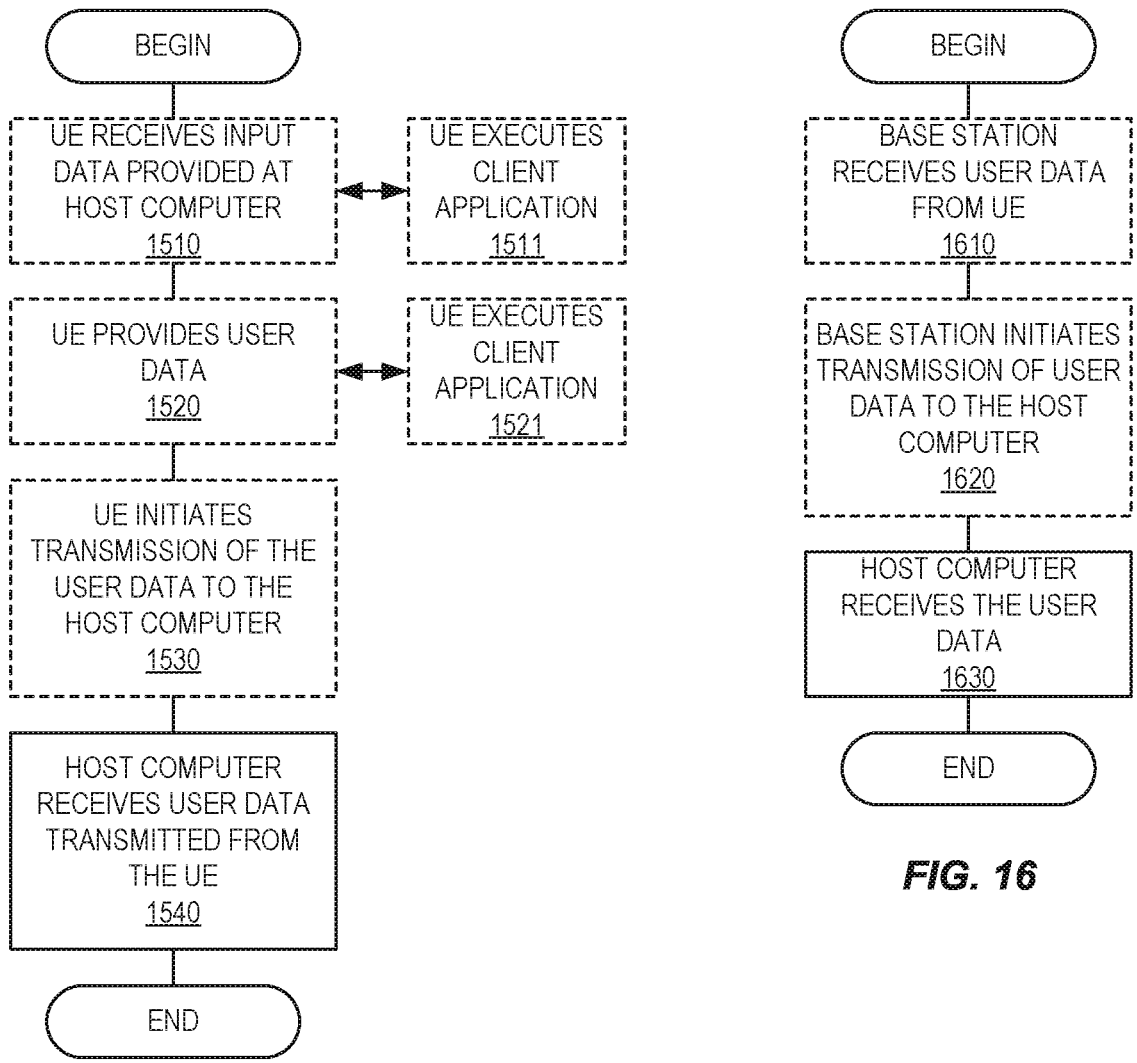
FIG. 15 is a flowchart illustrating a method implemented in a communication system, according to some embodiments of the present disclosure.
FIG. 16 is a flowchart illustrating a method implemented in a communication system, according to some embodiments of the present disclosure.

FIG. 15 is a flowchart illustrating a method implemented in a communication system, in accordance with one embodiment. The communication system includes a host computer, a base station, and a UE which may be those described with reference to FIGS. 11 and 12. For simplicity of the present disclosure, only drawing references to FIG. 15 will be included in this section. In step 1510 (which may be optional), the UE receives input data provided by the host computer. Additionally or alternatively, in step 1520 (which may be optional), the UE provides user data. In sub-step 1521 (which may be optional) of step 1520, the UE provides the user data by executing a client application. In sub-step 1511 (which may be optional) of step 1510, the UE executes a client application which provides the user data in reaction to the received input data provided by the host computer. In providing the user data, the executed client application may further consider user input received from the user. Regardless of the specific manner in which the user data was provided, the UE initiates, in sub-step 1530 (which may be optional), transmission of the user data to the host computer. In step 1540 of the method, the host computer receives the user data transmitted from the UE, in accordance with the teachings of the embodiments described throughout this disclosure.

FIG. 16 is a flowchart illustrating a method implemented in a communication system, in accordance with one embodiment. The communication system includes a host computer, a base station, and a UE which may be those described with reference to FIGS. 11 and 12. For simplicity of the present disclosure, only drawing references to FIG. 16 will be included in this section. In step 1610 (which may be optional), in accordance with the teachings of the embodiments described throughout this disclosure, the base station receives user data from the UE. In step 1620 (which may be optional), the base station initiates transmission of the received user data to the host computer. In step 1630 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include DSPs, special-purpose digital logic, and the like. The processing circuitry may be configured to execute program code stored in memory, which may include one or several types of memory such as ROM, RAM, cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices, and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

EMBODIMENTS

Group A Embodiments

1. A method performed by a wireless device, the method comprising:
   receiving an indication to enable multiple active configurations per cell and/or per bandwidth part, BWP.
2. The method of embodiment 1 wherein receiving the indication comprises:
   receiving, by RRC, Type 1 and Type 2 configurations per Serving Cell and/or per BWP.
3. The method of any of embodiment 1 to embodiment 2 wherein receiving the indication comprises:
   receiving, an indication that multiple configurations can be active simultaneously on one or multiple Serving Cells.
4. The method of any of embodiment 1 to embodiment 3 wherein, for Type 2, activation and deactivation are independent among the Serving Cells.
5. The method of any of embodiment 1 to embodiment 4 wherein, for the same Serving Cell, the MAC entity is configured with either Type 1 or Type 2.
6. The method of any of embodiment 1 to embodiment 5 wherein this allows having multiple periodical Time Sensitive Network, TSN, traffic with different periodicity and starting time.
7. The method of any of embodiment 1 to embodiment 6 wherein receiving the indication comprises:
   receiving, a pattern or a union of configurations to use different configurations that are repeated every new period.

8. The method of embodiment 7 wherein, for the pattern or union is CGConfigPatternList which describes the set of configurations every slot.
9. The method of any of embodiment 1 to embodiment 8 further comprising:
   determining that several configurations are all allowed for uplink, UL, transmission.
10. The method of any of embodiment 1 to embodiment 9 wherein all the ConfiguredGrantConfig can be used simultaneously, and the UL can transmit UL configured grant transmission in any of the occasion defined by any of the ConfiguredGrantConfig.
11. The method of any of embodiment 1 to embodiment 10 further comprising: choosing one grant free, GF, configuration from the list of allowed configurations and use it for UL transmission.
12. The method of any of embodiment 1 to embodiment 11 wherein it is possible to have several configurations (each can be Type 1 or Type 2), and each of the Type 2 configurations can be activated or deactivated separately.
13. The method of embodiment 12 wherein this can be realized by associating the time and/or frequency resources with 'configurationID' (such as by CS-RNTI).
14. The method of any of embodiment 1 to embodiment 13 further comprising:
   determining, when multiple UL configured grants are present, which GF a retransmission is associated with, and which HARQ process ID it should use.
15. The method of any of embodiment 1 to embodiment 14 further comprising:
   determining, to separately activate/deactivate each Type 2 configuration.
16. The method of any of embodiment 1 to embodiment 15 wherein all active GF (including Type 1 and Type 2) share the single CS-RNTI as in Rel-15; GF_process ID field is added in the DCI to indicate which GF process the DCI is associated with; and/or this is added in DCI formats for both the purposes of retransmission, as well as activation/de-activation.
17. The method of any of embodiment 1 to embodiment 16 wherein, when multiple configurations are defined, more CS-RNTI may be introduced to differentiate them.
18. The method of any of embodiment 1 to embodiment 17 wherein, there are multiple configured grants Type 2 "processes" but a common CS-RNTI and/or the HARQ process number and/or redundancy version field in activation DCI may indicate the configured grant "process".
19. The method of any of embodiment 1 to embodiment 18 wherein, to activate the specific sequence of each configuration parameter, the DCI signal type is changed (possibly with the same number of bits) and/or the DCI signal will be used as index for the RRC (sequence) parameter.
20. The method of any of the previous embodiments, further comprising:
   providing user data; and
   forwarding the user data to a host computer via the transmission to the base station.

Group B Embodiments

21. A method performed by a base station, the method comprising:
   transmitting to a wireless device an indication to enable multiple active configurations per cell and/or per bandwidth part, BWP.
22. The method of embodiment 21 wherein transmitting the indication comprises:
   transmitting, by RRC, Type 1 and Type 2 configurations per Serving Cell and/or per BWP.
23. The method of any of embodiment 21 to embodiment 22 wherein transmitting the indication comprises:
   receiving, an indication that multiple configurations can be active simultaneously on one or multiple Serving Cells.
24. The method of any of embodiment 21 to embodiment 23 wherein, for Type 2, activation and deactivation are independent among the Serving Cells.
25. The method of any of embodiment 21 to embodiment 24 wherein, for the same Serving Cell, the MAC entity is configured with either Type 1 or Type 2.
26. The method of any of embodiment 21 to embodiment 25 wherein this allows having multiple periodical Time Sensitive Network, TSN, traffic with different periodicity and starting time.
27. The method of any of embodiment 21 to embodiment 26 wherein transmitting the indication comprises:
   transmitting, a pattern or a union of configurations to use different configurations that are repeated every new period.
28. The method of embodiment 27 wherein, for the pattern or union is CGConfigPatternList, which describes the set of configurations every slot.
29. The method of any of embodiment 21 to embodiment 28 further comprising:
   determining and/or indicating that several configurations are all allowed for uplink, UL, transmission.
30. The method of any of embodiment 21 to embodiment 29 wherein all the ConfiguredGrantConfig can be used simultaneously, and the UL can transmit UL configured grant transmission in any of the occasion defined by any of the ConfiguredGrantConfig.
31. The method of any of embodiment 21 to embodiment 30 further comprising: choosing one grant free, GF, configuration from the list of allowed configurations and use it for UL transmission.
32. The method of any of embodiment 21 to embodiment 31 wherein it is possible to have several configurations (each can be Type 1 or Type 2), and each of the Type 2 configurations can be activated or deactivated separately.
33. The method of embodiment 32 wherein this can be realized by associating the time and/or frequency resources with 'configurationID' (such as by CS-RNTI).
34. The method of any of embodiment 21 to embodiment 33 further comprising:
   determining, when multiple UL configured grants are present, which GF a retransmission is associated with, and which HARQ process ID it should use.
35. The method of any of embodiment 21 to embodiment 34 further comprising:
   determining, to separately activate/deactivate each Type 2 configuration.
36. The method of any of embodiment 21 to embodiment 35 wherein all active GF (including Type 1 and Type 2) share the single CS-RNTI as in Rel-15; GF_process ID field is added in the DCI to indicate which GF process the DCI is associated with; and/or this is added in DCI formats for both the purposes of retransmission, as well as activation/de-activation.
37. The method of any of embodiment 21 to embodiment 36 wherein, when multiple configurations are defined, more CS-RNTI may be introduced to differentiate them.

38. The method of any of embodiment 21 to embodiment 37 wherein, there are multiple configured grants Type 2 "processes" but a common CS-RNTI and/or the HARQ process number and/or redundancy version field in activation DCI may indicate the configured grant "process".
39. The method of any of embodiment 21 to embodiment 38 wherein, to activate the specific sequence of each configuration parameter, the DCI signal type is changed (possibly with the same number of bits) and/or the DCI signal will be used as index for the RRC (sequence) parameter.
40. The method of any of the previous embodiments, further comprising:
    obtaining user data; and
    forwarding the user data to a host computer or a wireless device.

Group C Embodiments

41. A wireless device, the wireless device comprising:
    processing circuitry configured to perform any of the steps of any of the Group A embodiments; and
    power supply circuitry configured to supply power to the wireless device.
42. A base station, the base station comprising:
    processing circuitry configured to perform any of the steps of any of the Group B embodiments;
    power supply circuitry configured to supply power to the base station.
43. A User Equipment, UE, comprising:
    an antenna configured to send and receive wireless signals;
    radio front-end circuitry connected to the antenna and to processing circuitry, and configured to condition signals communicated between the antenna and the processing circuitry;
    the processing circuitry being configured to perform any of the steps of any of the Group A embodiments;
    an input interface connected to the processing circuitry and configured to allow input of information into the UE to be processed by the processing circuitry;
    an output interface connected to the processing circuitry and configured to output information from the UE that has been processed by the processing circuitry; and
    a battery connected to the processing circuitry and configured to supply power to the UE.
44. A communication system including a host computer comprising:
    processing circuitry configured to provide user data; and
    a communication interface configured to forward the user data to a cellular network for transmission to a User Equipment, UE,
    wherein the cellular network comprises a base station having a radio interface and processing circuitry, the base station's processing circuitry configured to perform any of the steps of any of the Group B embodiments.
45. The communication system of the previous embodiment further including the base station.
46. The communication system of the previous 2 embodiments, further including the UE, wherein the UE is configured to communicate with the base station.
47. The communication system of the previous 3 embodiments, wherein:
    the processing circuitry of the host computer is configured to execute a host application, thereby providing the user data; and
    the UE comprises processing circuitry configured to execute a client application associated with the host application.
48. A method implemented in a communication system including a host computer, a base station and a User Equipment, UE, the method comprising:
    at the host computer, providing user data; and
    at the host computer, initiating a transmission carrying the user data to the UE via a cellular network comprising the base station, wherein the base station performs any of the steps of any of the Group B embodiments.
49. The method of the previous embodiment, further comprising, at the base station, transmitting the user data.
50. The method of the previous 2 embodiments, wherein the user data is provided at the host computer by executing a host application, the method further comprising, at the UE, executing a client application associated with the host application.
51. A User Equipment, UE, configured to communicate with a base station, the UE comprising a radio interface and processing circuitry configured to perform the method of the previous 3 embodiments.
52. A communication system including a host computer comprising:
    processing circuitry configured to provide user data; and
    a communication interface configured to forward user data to a cellular network for transmission to a User Equipment, UE,
    wherein the UE comprises a radio interface and processing circuitry, the UE's components configured to perform any of the steps of any of the Group A embodiments.
53. The communication system of the previous embodiment, wherein the cellular network further includes a base station configured to communicate with the UE.
54. The communication system of the previous 2 embodiments, wherein:
    the processing circuitry of the host computer is configured to execute a host application, thereby providing the user data; and
    the UE's processing circuitry is configured to execute a client application associated with the host application.
55. A method implemented in a communication system including a host computer, a base station and a User Equipment, UE, the method comprising:
    at the host computer, providing user data; and
    at the host computer, initiating a transmission carrying the user data to the UE via a cellular network comprising the base station, wherein the UE performs any of the steps of any of the Group A embodiments.
56. The method of the previous embodiment, further comprising at the UE, receiving the user data from the base station.
57. A communication system including a host computer comprising:
    communication interface configured to receive user data originating from a transmission from a User Equipment, UE, to a base station,
    wherein the UE comprises a radio interface and processing circuitry, the UE's processing circuitry configured to perform any of the steps of any of the Group A embodiments.
58. The communication system of the previous embodiment, further including the UE.
59. The communication system of the previous 2 embodiments, further including the base station, wherein the base station comprises a radio interface configured to communicate with the UE and a communication interface configured to forward to the host computer the user data carried by a transmission from the UE to the base station.

60. The communication system of the previous 3 embodiments, wherein:
the processing circuitry of the host computer is configured to execute a host application; and
the UE's processing circuitry is configured to execute a client application associated with the host application, thereby providing the user data.

61. The communication system of the previous 4 embodiments, wherein:
the processing circuitry of the host computer is configured to execute a host application, thereby providing request data; and
the UE's processing circuitry is configured to execute a client application associated with the host application, thereby providing the user data in response to the request data.

62. A method implemented in a communication system including a host computer, a base station and a User Equipment, UE, the method comprising:
at the host computer, receiving user data transmitted to the base station from the UE, wherein the UE performs any of the steps of any of the Group A embodiments.

63. The method of the previous embodiment, further comprising, at the UE, providing the user data to the base station.

64. The method of the previous 2 embodiments, further comprising:
at the UE, executing a client application, thereby providing the user data to be transmitted; and
at the host computer, executing a host application associated with the client application.

65. The method of the previous 3 embodiments, further comprising:
at the UE, executing a client application; and
at the UE, receiving input data to the client application, the input data being provided at the host computer by executing a host application associated with the client application,
wherein the user data to be transmitted is provided by the client application in response to the input data.

66. A communication system including a host computer comprising a communication interface configured to receive user data originating from a transmission from a User Equipment, UE, to a base station, wherein the base station comprises a radio interface and processing circuitry, the base station's processing circuitry configured to perform any of the steps of any of the Group B embodiments.

67. The communication system of the previous embodiment further including the base station.

68. The communication system of the previous 2 embodiments, further including the UE, wherein the UE is configured to communicate with the base station.

69. The communication system of the previous 3 embodiments, wherein:
the processing circuitry of the host computer is configured to execute a host application;
the UE is configured to execute a client application associated with the host application, thereby providing the user data to be received by the host computer.

70. A method implemented in a communication system including a host computer, a base station and a User Equipment, UE, the method comprising:
at the host computer, receiving, from the base station, user data originating from a transmission which the base station has received from the UE, wherein the UE performs any of the steps of any of the Group A embodiments.

71. The method of the previous embodiment, further comprising at the base station, receiving the user data from the UE.

72. The method of the previous 2 embodiments, further comprising at the base station, initiating a transmission of the received user data to the host computer.

At least some of the following abbreviations may be used in this disclosure. If there is an inconsistency between abbreviations, preference should be given to how it is used above. If listed multiple times below, the first listing should be preferred over any subsequent listing(s).

2G Second Generation
3G Third Generation
3GPP Third Generation Partnership Project
4G Fourth Generation
5G Fifth Generation
AC Alternating Current
AF Application Function
AN Access Network
AP Access Point
ASIC Application Specific Integrated Circuit
ATM Asynchronous Transfer Mode
AUSF Authentication Server Function
BS Base Station
BSC Base Station Controller
BTS Base Transceiver Station
BWP Bandwidth Part
CD Compact Disk
CDMA Code Division Multiple Access
CG Configured Grant
COTS Commercial Off-the-Shelf
CPE Customer Premise Equipment
CPU Central Processing Unit
D2D Device-to-Device
DAS Distributed Antenna System
DC Direct Current
DCI Downlink Channel Information
DIMM Dual In-Line Memory Module
DL Downlink
DN Data Network
DSP Digital Signal Processor
DVD Digital Video Disk
EEPROM Electrically Erasable Programmable Read Only Memory
eMBB Enhanced Mobile Broadband
eMTC Enhanced Machine Type Communication
eNB Enhanced or Evolved Node B
E-SMLC Evolved Serving Mobile Location Center
FCG Flexible Configured Grant
FPGA Field Programmable Gate Array
GF Group Feature
GHz Gigahertz
gNB New Radio Base Station
GPS Global Positioning System
GSM Global System for Mobile Communications
HARQ Hybrid Automatic Repeat Request
HDDS Holographic Digital Data Storage
HD-DVD High Density Digital Video Disc
IoT Internet of Things
IP Internet Protocol
kHz Kilohertz
LAN Local Area Network LEE Laptop Embedded Equipment
LME Laptop Mounted Equipment
LTE Long Term Evolution
M2M Machine-to-Machine
MAC Medium Access Control
MAC-CE Medium Access Control Control Element
MANO Management and Orchestration
MCE Multi-Cell/Multicast Coordination Entity
MCS Modulation and Coding Scheme
MDT Minimization of Drive Tests
MIMO Multiple Input Multiple Output
MME Mobility Management Entity
MSC Mobile Switching Center
MSR Multi-Standard Radio
MTC Machine Type Communication
NB-IoT Narrowband Internet of Things
NEF Network Exposure Function
NF Network Function
NFV Network Function Virtualization
NIC Network Interface Controller
NR New Radio
NRF Network Repository Function
NSSF Network Slice Selection Function
O&M Operation and Maintenance
OFDM Orthogonal Frequency Division Multiplexing
OSS Operations Support System
OTT Over-the-Top
PCF Policy Control Function
PDA Personal Digital Assistant
PDCC0H Physical downlink Control Channel
P-GW Packet Data Network Gateway
PROM Programmable Read Only Memory
PSTN Public Switched Telephone Network
PUSCH Physical Uplink Shared Channel
QoS Quality of Service
RAID Redundant Array of Independent Disks
RAM Random Access Memory
RAN Radio Access Network
RAT Radio Access Technology
RB Resource Block
RF Radio Frequency
RNC Radio Network Controller
ROM0 Read Only Memory
RRC Radio Resource Control
RRH Remote Radio Head
RRU Remote Radio Unit
RTT Round Trip Time
RUIM Removable User Identity Module
RV Redundancy Version
SCEF Service Capability Exposure Function
SCS Sub-Carrier Spacing
SDRAM Synchronous Dynamic RAM
SFN System Frame Number
SIM Subscriber Identity Module
SLIV Start and Length Indicator
SMF Session Management Function
SOC System on a Chip
SON Self-Organizing Network
SONET Synchronous Optical Networking
SPS Semi-Persistent Scheduling
TBS Transport Block Size
TCP Transmission Control Protocol
TSN Time Sensitive Network
TTI Time Transmission Interval
UDM Unified Data Management
UE User Equipment
UL Uplink
UMTS Universal Mobile Telecommunications System
URLLC Ultra-Reliable Low-Latency Communication
USB Universal Serial Bus
UTRAN Universal Terrestrial RAN
V2I Vehicle-to-Infrastructure
V2V Vehicle-to-Vehicle
V2X Vehicle-to-Everything
VMM Virtual Machine Monitor
VNE Virtual Network Element
VNF Virtual Network Function
VoIP Voice over Internet Protocol
WAN Wide Area Network
WCDMA Wideband Code Division Multiple Access
WD Wireless Device
WiMax Worldwide Interoperability for Microwave Access
WLAN Wireless Local Area Network Those skilled in the art will recognize improvements and modifications to the embodiments of the present disclosure. All such improvements and modifications are considered within the scope of the concepts disclosed herein.

What is claimed is:

1. A method performed by a wireless device for handling uplink grants, the method comprising:
receiving, from a network node, an indication to enable multiple configured grant configurations per cell or per bandwidth part, BWP, where at least one configured grant configuration indicates a plurality of transmission occasions within a period wherein the indication includes a single pattern for the multiple configured grant configuration, which single pattern for the multiple configured grant configuration is a packet generation pattern created using a respective packet generation pattern of the multiple configured grant configurations, and wherein the single pattern is a bitmap indicating the packet generation pattern within the period, and when the packet generation pattern includes multiple packets during the same transmission occasion, the bitmap includes number of consecutive transmission occasions enabling the use of different periodicity of mixed Time Sensitive Network, TSN, random Ultra-Reliable Low-Latency Communication, URLLC, and enhanced Mobile Broadband, eMBB, traffics; and
transmitting, to the network node, at least one transmission based on the at least one configured grant configuration.

2. The method of claim 1 wherein a periodicity of the indicated plurality of transmission occasions is a greatest common factor of periods of the multiple configurations.

3. The method of claim 1 wherein the one or more indications includes a configuredGrantPattern comprised in a ConfiguredGrantConfig.

4. The method of claim 1 wherein the one or more indications indicates multiple transmission occasions for at least one configured grant.

5. The method of claim 4 wherein the period equals P and the one or more indications indicates that the transmission occasions start at time locations:

$$N*P-2*t\_offset, N*P-t\_offset, N*P, N*P+t\_offset, N*P+2*t\_offset$$

wherein t_offset is a length of the at least one transmission and N is an integer.

6. The method of claim 1 wherein receiving the indication comprises:
receiving, by Radio Resource Control, RRC, Type 1 and Type 2 configurations per Serving Cell or per BWP.

7. The method of claim 1 wherein transmitting the at least one transmission based on the at least one configured grant configuration comprises transmitting the at least one transmission in order to reduce misalignment.

8. The method of claim 1 wherein, for Type 2, activation and deactivation are independent among the Serving Cells.

9. The method of claim 1 wherein, for the same Serving Cell, a Medium Access Control, MAC, entity is configured with either Type 1 or Type 2.

10. The method of claim 1 wherein receiving the indication to enable multiple configured grant configurations allows having multiple periodical Time Sensitive Network, TSN, traffics with different periodicities or starting times.

11. The method of claim 1 wherein receiving the plurality of transmission occasions within the period comprises a union of configurations to use different configurations that are repeated every new period.

12. The method of claim 1 further comprising:
determining that several configured grant configurations are all allowed for uplink, UL, transmission; and
selecting one of the several configured grant configurations to use for a transmission.

13. The method of claim 1 wherein all the ConfiguredGrantConfig can be used simultaneously, and the UL can transmit a UL configured grant transmission in any occasion defined by any of the ConfiguredGrantConfig.

14. The method of claim 1 further comprising: several configurations (each can be Type 1 or Type 2), and each of the Type 2 configurations can be activated or deactivated separately.

15. The method of claim 14 wherein this can be realized by associating the time or frequency resources with 'configurationID' (such as by Configured Scheduling-Radio Network Temporary Identifier, CS-RNTI).

16. The method of claim 1 further comprising:
determining, when multiple UL configured grants are present, which Group Feature, GF, a retransmission is associated with, and which Hybrid Automatic Repeat Request, HARQ, process ID the retransmission should use.

17. The method of claim 1 further comprising:
determining, to separately activate/deactivate each Type 2 configuration.

18. The method of claim 1 wherein all active GFs (including Type 1 and Type 2) share the single CS-RNTI as in Rel-15; GF process ID field is added in Downlink Control Information, DCI, to indicate which GF process the DCI is associated with; or this is added in DCI formats for both the purposes of retransmission, as well as activation/de-activation.

19. The method of claim 1 wherein, when the multiple configurations are defined, more CS-RNTIs may be introduced to differentiate the multiple configurations.

20. The method of claim 1 wherein there are multiple configured grant Type 2 processes but a common CS-RNTI or a HARQ process number or redundancy version field in activation DCI may indicate the configured grant process.

21. The method of claim 1 wherein, to activate a specific sequence of each configuration parameter, a DCI signal type is changed or a DCI signal will be used as index for the RRC (sequence) parameter.

22. A method performed by a network node for configuring uplink grants, the method comprising:
transmitting, to a wireless device, an indication to enable multiple configured grant configurations per cell or per bandwidth part, BWP, where at least one configured grant configuration indicates a plurality of transmission occasions within a period wherein the indication includes a single pattern for the multiple configured grant configuration, which single pattern for the multiple configured grant configuration is a packet generation pattern created using a respective packet generation pattern of the multiple configured grant configurations, and wherein the single pattern is a bitmap indicating the packet generation pattern within the period, and when the packet generation pattern includes multiple packets during the same transmission occasion, the bitmap includes number of consecutive transmission occasions enabling the use of different periodicity of mixed Time Sensitive Network, TSN, random Ultra-Reliable Low-Latency Communication, URLLC, and enhanced Mobile Broadband, eMBB, traffics; and
receiving, from the wireless device, at least one transmission based on the at least one configured grant configuration.

23. A network node for configuring uplink grants, comprising:
one or more network interfaces;
one or more processors; and
memory comprising instructions executable by the one or more processors whereby the network node is operable to:
transmit, to a wireless device, an indication to enable multiple configured grant configurations per cell or per bandwidth part, BWP, where at least one configured grant configuration indicates a plurality of transmission occasions within a period wherein the indication includes a single pattern for the multiple configured grant configuration, which single pattern for the multiple configured grant configuration is a packet generation pattern created using a respective packet generation pattern of the multiple configured grant configurations, and wherein the single pattern is a bitmap indicating the packet generation pattern within the period, and when the packet generation pattern includes multiple packets during the same transmission occasion, the bitmap includes number of consecutive transmission occasions enabling the use of different periodicity of mixed Time Sensitive Network, TSN, random Ultra-Reliable Low-Latency Communication, URLLC, and enhanced Mobile Broadband, eMBB, traffics; and
receive, from the wireless device, at least one transmission based on the at least one configured grant configuration.

* * * * *